United States Patent
Linn et al.

(10) Patent No.: US 10,237,711 B2
(45) Date of Patent: Mar. 19, 2019

(54) DYNAMIC TYPES FOR ACTIVITY CONTINUATION BETWEEN ELECTRONIC DEVICES

(71) Applicant: Apple Inc., Cupertino, CA (US)

(72) Inventors: Christopher S. Linn, Palo Alto, CA (US); Keith Stattenfield, Santa Clara, CA (US); Alexander J. Dunn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,931

(22) Filed: Sep. 30, 2015

(65) Prior Publication Data

US 2016/0029153 A1 Jan. 28, 2016

Related U.S. Application Data

(63) Continuation-in-part of application No. 14/586,566, filed on Dec. 30, 2014.
(Continued)

(51) Int. Cl.
*G06F 9/48* (2006.01)
*H04W 4/80* (2018.01)
*H04L 29/08* (2006.01)

(52) U.S. Cl.
CPC ............ *H04W 4/80* (2018.02); *G06F 9/4856* (2013.01); *H04L 67/10* (2013.01); *H04L 67/22* (2013.01)

(58) Field of Classification Search
CPC ....... G06F 9/4856; G06F 9/461; H04L 67/148
See application file for complete search history.

(56) References Cited

U.S. PATENT DOCUMENTS 7,085,595 B2 8/2006 Kitchin
7,277,947 B1 10/2007 Van De Sluis et al.
(Continued)

FOREIGN PATENT DOCUMENTS

KR 10-1209951 B1 12/2012
KR 10-2013-0075783 A 7/2013
(Continued)

*Primary Examiner* — Arvin Eskandarnia
*Assistant Examiner* — Austin J Moreau
(74) *Attorney, Agent, or Firm* — Invoke

(57) ABSTRACT

The described embodiments transfer an activity from a source electronic device to a companion electronic device. The source electronic device receives activity information describing an activity performed in a first application at the source electronic device, determines an activity identifier for the activity information, and broadcasts an activity advertisement comprising the activity identifier. Upon receiving the activity advertisement, the companion electronic device determines whether a second application that is associated with the first application is available at the companion electronic device. If the second application is available, the companion electronic device requests extended activity data from the source electronic device. The source electronic device responds by sending extended activity data from the first application to the companion electronic device. Then, the companion electronic device uses the extended activity data to configure the second application and commences performing the activity with the second application at the companion electronic device.

22 Claims, 18 Drawing Sheets

Related U.S. Application Data

(60) Provisional application No. 62/005,781, filed on May 30, 2014, provisional application No. 62/171,873, filed on Jun. 5, 2015.

(56) References Cited

U.S. PATENT DOCUMENTS

| | | | |
|---|---|---|---|
| 8,422,503 B2 | 4/2013 | Chida | |
| 8,473,577 B2 | 6/2013 | Chan | |
| 8,583,090 B2 | 11/2013 | Vartianen et al. | |
| 8,751,451 B2 | 6/2014 | Uola | |
| 8,775,850 B2 | 7/2014 | Moy | |
| 8,909,886 B1* | 12/2014 | Clark | G06F 9/4856 |
| | | | 711/112 |
| 8,964,947 B1 | 2/2015 | Noolu | |
| 8,966,547 B2 | 2/2015 | Kim | |
| 9,270,708 B2 | 2/2016 | Dave et al. | |
| 2005/0154774 A1* | 7/2005 | Giaffreda | H04W 4/18 |
| | | | 709/200 |
| 2007/0054627 A1 | 3/2007 | Wormald | |
| 2007/0275725 A1* | 11/2007 | Tsunehara | H04W 36/26 |
| | | | 455/436 |
| 2008/0160974 A1 | 7/2008 | Vartiainen et al. | |
| 2011/0153789 A1* | 6/2011 | Vandwalle | H04W 76/023 |
| | | | 709/221 |
| 2011/0208825 A1 | 8/2011 | Lee et al. | |
| 2012/0096069 A1 | 4/2012 | Chan | |
| 2012/0096368 A1 | 4/2012 | McDowell | |
| 2012/0117400 A1 | 5/2012 | Vandwalle et al. | |
| 2013/0007499 A1* | 1/2013 | Moy | G06F 3/1423 |
| | | | 713/400 |
| 2013/0054720 A1* | 2/2013 | Kang | G06Q 50/01 |
| | | | 709/206 |
| 2013/0212212 A1 | 8/2013 | Addepalli et al. | |
| 2013/0332846 A1 | 12/2013 | Freedman | |
| 2014/0173447 A1* | 6/2014 | Das | G06F 3/04842 |
| | | | 715/738 |
| 2014/0188802 A1 | 7/2014 | Branton | |
| 2014/0237123 A1 | 8/2014 | Dave et al. | |
| 2014/0289415 A1* | 9/2014 | Chan | G06F 9/54 |
| | | | 709/226 |
| 2015/0012861 A1 | 1/2015 | Loginov | |
| 2015/0235030 A1 | 8/2015 | Chaiken et al. | |
| 2015/0292486 A1 | 10/2015 | Zhou et al. | |
| 2015/0295682 A1 | 10/2015 | Megard et al. | |
| 2015/0350355 A1 | 12/2015 | Linn | |
| 2015/0350356 A1 | 12/2015 | Linn | |
| 2015/0373084 A1 | 12/2015 | Krochmal | |
| 2016/0029153 A1 | 1/2016 | Linn | |
| 2016/0227470 A1 | 8/2016 | Liu | |
| 2016/0248589 A1 | 8/2016 | Potlapally et al. | |
| 2017/0024199 A1* | 1/2017 | Lachwani | H04L 67/10 |

FOREIGN PATENT DOCUMENTS

| | | |
|---|---|---|
| KR | 10-2013-0124363 A | 11/2013 |
| WO | 2005109829 | 11/2005 |
| WO | 2010/089458 A1 | 8/2010 |

* cited by examiner

SOURCE ELECTRONIC DEVICE 202

COMPANION ELECTRONIC DEVICE 204

RECEIVE ACTIVITY
INFORMATION
A1 = "com.apple.Mail:Read"
1800

RECEIVE IDENTIFIER
B1 = "00"
1802

GENERATE HASH
H1=HASH(A1, B1)
1804

BROADCAST
ADVERTISEMENT WITH
HASH(A1,B1)
1806

RECEIVE ACTIVITY
INFORMATION
E1 = "com.apple.Mail:Read"
1810

RECEIVE IDENTIFIER
F1 = "00"
1812

GENERATE HASH
H2=HASH(E1, F1)
1814

STORE H2 IN AVAILABLE-
ACTIVITY TABLE
1816

RECEIVE ADVERTISEMENT
1818

FIG. 18A

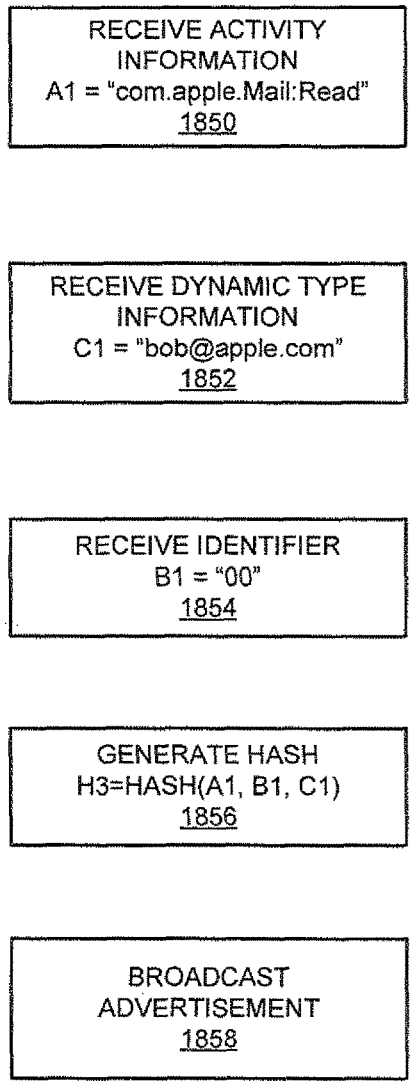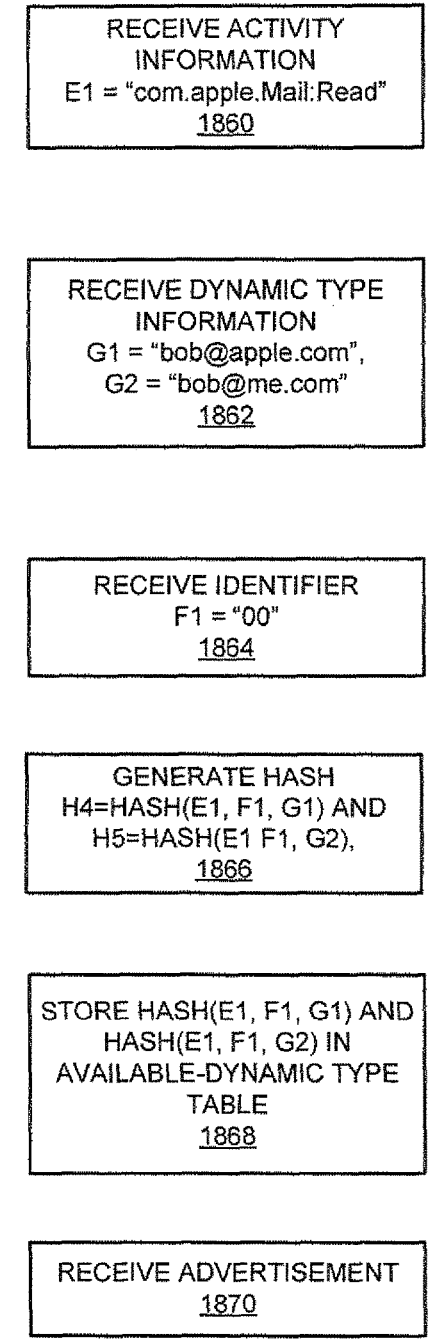
FIG. 18B

DYNAMIC TYPES FOR ACTIVITY CONTINUATION BETWEEN ELECTRONIC DEVICES

PRIORITY CLAIM

The instant application is a continuation in part of, and hereby claims priority to, pending U.S. patent application Ser. No. 14/586,566, which was filed on 30 Dec. 2014. The instant application also claims priority to U.S. provisional patent application No. 62/005,781, which was filed on 30 May 2014, to which parent application Ser. No. 14/586,566 claims priority. The instant application further claims priority to U.S. provisional patent application No. 62/171,873, which was filed on 5 Jun. 2015. These applications are each incorporated by reference.

RELATED APPLICATIONS

The instant application is related to pending U.S. patent application Ser. No. 14/586,566, which is titled "Activity Continuation Between Electronic Devices," by inventors Marc J. Krochmal, Christopher S. Linn, John J. Iarocci, Geoffrey Stahl, and Jacques P. Gasselin de Richebourg, and filed on 30 Dec. 2014, the contents of which are incorporated herein by reference.

The instant application is also related to pending U.S. patent application Ser. No. 14/586,511, which is titled "Companion Application for Activity Cooperation," by inventors Marc J. Krochmal, Christopher S. Linn, John J. Iarocci, Geoffrey Stahl, and Jacques P. Gasselin de Richebourg, and filed on 30 Dec. 2014, the contents of which are incorporated herein by reference.

The instant application is also related to pending U.S. patent application Ser. No. 14/475,329, which is titled "Operating-Mode Transitions based on Advertising Information," by inventors Craig P. Dooley, Akshay Mangalam Srivatsa, Anjali S. Sandesara, and Michael Giles, and filed on 2 Sep. 2014, the contents of which are incorporated herein by reference.

The instant application is also related to pending U.S. patent application Ser. No. 14/474,466, which is titled "Predefined Wireless Pairing," by inventors Jason C. Conn, Akshay Mangalam Srivatsa, Craig P. Dooley, and Michael Giles, and filed on 2 Sep. 2014, the contents of which are incorporated herein by reference.

BACKGROUND

Field

The disclosed embodiments relate to electronic devices. More specifically, the disclosed embodiments relate to activity continuation between electronic devices.

Related Art

Recent advances in computer technology have enabled manufacturers to produce powerful computing devices in various form factors, thereby enabling users to use a device as small and portable as a smartphone or a tablet to perform tasks that once required a desktop or laptop computer. Because of these advances, users often possess and use multiple computing devices, e.g., a smartphone while on the road, a tablet in meetings, and a laptop or desktop computer at a desk.

Although a user may possess different devices, each with powerful computing capabilities, in certain cases, the user may find him- or herself using a device that is ill-suited for a task being performed or for the situation that the user is in. For example, the user may start what is intended as a short email on a device such as a smartphone with a small display screen and then, due to the size of the display screen, may have a difficult time entering and editing text in the email when the email turns out to be longer than anticipated. Alternatively, the user may be reading a web page or watching a movie on a desktop but may have to leave the room in which the desktop is located. Although the user may retrieve another device and start the task, this is cumbersome.

BRIEF DESCRIPTION OF THE FIGURES

FIG. 18A presents example of operations performed when performing activity continuation without using dynamic type information in accordance with some embodiments.

FIG. 18B presents example of operations performed when performing activity continuation using dynamic type information in accordance with some embodiments.

In the figures, like reference numerals refer to the same figure elements.

DETAILED DESCRIPTION

Figure 1:
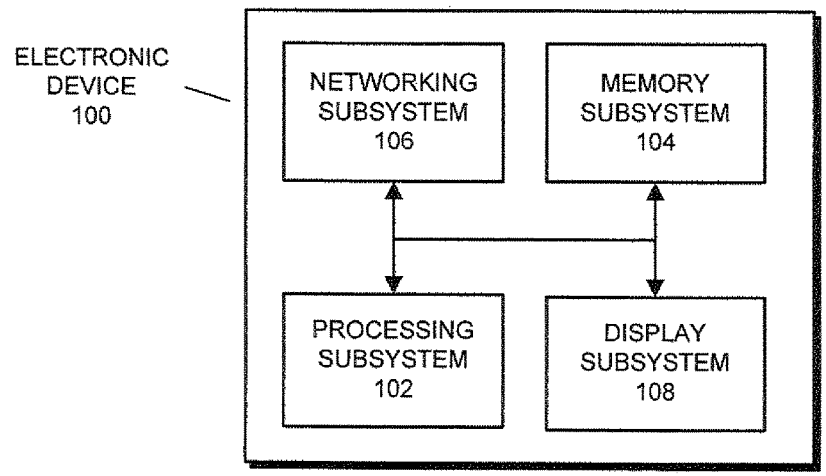
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, an electronic device (e.g., electronic device 100 in FIG. 1 and/or some portion thereof) uses code and/or data stored on a computer-readable storage medium to perform some or all of the operations herein described. More specifically, the electronic device reads the code and/or data from the computer-readable storage medium and executes the code and/or uses the data when performing the described operations. In these embodiments, a computer-readable storage medium can be any device or medium or combination thereof that stores code and/or data for use by an electronic device. For example, the computer-readable storage medium can include, but is not limited to, volatile memory or non-volatile memory, such as semiconductor memories (e.g., flash memory, random access memory (eDRAM, RAM, SRAM, DRAM, DDR, DDR2/DDR3/DDR4 SDRAM, etc.), etc.) and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In this description, functional blocks may be referred to in describing some embodiments. Generally, functional blocks include one or more interrelated circuits, devices, and/or mechanisms that perform described operations. In some embodiments, at least some of the functional blocks include general-purpose processing circuits that execute program code (e.g., microcode, firmware, applications, etc.) that causes the general-purpose processing circuits to perform the described operations.

Overview

The described embodiments transfer an activity performed at a source electronic device from the source electronic device to a companion electronic device—a process that is referred to as "continuing" the activity in the companion electronic device. In the described embodiments, to perform the transfer, the source electronic device sends information that describes an activity performed in a first application at the source electronic device to the companion electronic device. The companion electronic device then uses some or all of the information to configure a second application at the companion electronic device to perform a corresponding activity. Generally, the activity includes one or more operations that are performed at least partially at the source electronic device that are transferred to/continued on the companion electronic device. Examples of activities include reading and/or editing a document (e.g., a word processing document, spreadsheet, presentation, or other type of document), composing an email message, an email, voice message or video, drafting a note, accessing (browsing) a website, watching a movie, playing an audio file, or otherwise using an application or app to perform corresponding operations.

In some embodiments, when transferring an activity from the source device to the companion device, the source electronic device first broadcasts an activity advertisement message (also referred to as an "activity advertisement") using a wireless network interface (e.g., Bluetooth low energy (BLE), ZigBee, etc.). In some embodiments, the source electronic device generates an activity identifier for the activity performed in a first application at the source electronic device and includes the activity identifier in the activity advertisement message. The source electronic device generates the activity identifier by performing a set of operations (e.g., a hash operation, etc.) using activity information that describes the activity that is received from the first application. Examples of activity information are described in more detail below with reference to FIG. 11.

The companion electronic device monitors a network (e.g., a Bluetooth low energy network) for activity advertisement messages on a network interface corresponding to the network interface in the source electronic device from which the activity advertisement was broadcast. Upon detecting the activity advertisement broadcast from the source electronic device, the companion electronic device compares activity identifiers for activities that are available at the companion electronic device to the activity identifier in the activity advertisement message. The companion electronic device uses this comparison to determine whether a second application that can perform an activity corresponding to the activity performed in the first application is available at the companion electronic device.

In some embodiments, upon determining that the second application is available, the companion electronic device establishes communication with the source electronic device over a communication channel (e.g., using the same wireless network interface used to receive the activity advertisement message or a different network interface, wireless and/or wired). The companion electronic device then uses the communication channel to request extended activity data for the activity performed in the first application from the source electronic device. In some embodiments, upon receiving the request for extended activity data, the source electronic device uses the same (or a different) communication channel to provide the extended activity data to the companion electronic device. Generally, the extended activity data includes information that can be used to configure the second application in the companion electronic device to continue the activity, such as a document identifier, a scroll position, a uniform resource locator (URL), etc. related to the activity performed in the first application.

In some embodiments, the companion electronic device uses the activity identifier and/or the extended activity data to configure the second application to perform an activity corresponding to the activity performed in the first application at the source electronic device. Then, the companion electronic device starts performing the activity in the second application at the companion electronic device. For example, after the companion electronic device configures the second application, a user can use the companion electronic device to continue working on a document that the user was working with at the source electronic device, to continue watching a movie that the user was watching at the source electronic device, to continue browsing a webpage that the user was browsing at the source electronic device, etc. In some embodiments, the companion electronic device sends a notification to the source electronic device to indicate that the activity was transferred to the second application. The notification can cause the source electronic device and/or the first application to perform housekeeping tasks, such as deleting a document draft for the activity, closing an open document for the activity, etc.

In some embodiments, the source and companion electronic devices use dynamic type information to describe attributes of activities performed at the devices. Dynamic type information can enable an application to provide conditions under which activity continuation can be made available. For example, a user may have access to a personal email account on a desktop computer but not on a phone. By using dynamic type information to indicate, for example, that the user is composing an email message for a specific account, some embodiments can prevent electronic devices that do not have access to that email account from showing notifications to indicate that the activity of composing the email message can be transferred.

By performing the operations described above for continuing an activity performed at the source electronic device at the companion electronic device, the described embodiments enable a user to continue a task seamlessly and without complex user intervention. This enables the user to more easily perform tasks on desired electronic devices, which can improve the user's overall experience with two or more electronic devices.

Electronic Device

FIG. 1 presents a block diagram illustrating electronic device 100 in accordance with some embodiments. Electronic device 100 includes processing subsystem 102, memory subsystem 104, networking subsystem 106, and display subsystem 108.

Processing subsystem 102 is a functional block that performs computational operations in electronic device 100. Processing subsystem 102 includes one or more central processing units (CPUs)/CPU cores, graphics processing units (GPUs)/GPU cores, embedded processors, application specific integrated circuits (ASICs), and/or other computational mechanisms.

Memory subsystem 104 is a functional block that stores data and/or instructions for use by other functional blocks in electronic device 100 (e.g., processing subsystem 102, etc.). Memory subsystem 104 includes volatile memory circuits such as dynamic random access memory (DRAM), static random access memory (SRAM), and/or other types of memory that are used for storing the instructions and data, as well as mechanisms for controlling the memory circuits.

In some embodiments, memory subsystem 104 includes a memory hierarchy with one or more caches coupled to the memory circuits. In some of these embodiments, processing subsystem 102 also includes one or more caches that are part of the memory hierarchy.

In some embodiments, memory subsystem 104 is coupled to one or more non-volatile high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 is a functional block that includes one or more devices configured to couple to and communicate on a wired and/or wireless network (i.e., to perform network operations). For example, networking subsystem 106 can include a Bluetooth™ networking system, a cellular networking system (e.g., a 3G/4G network such as UMTS, LTE, etc.), a universal serial bus (USB) networking system, a networking system based on the standards described in IEEE 802.11, 802.15, etc. (e.g., a ZigBee or Wi-Fi networking system, etc.), an Ethernet networking system, and/or another networking system. Networking subsystem 106 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Display subsystem 108 is a functional block that includes one or more devices configured to display information on a visual interface for electronic device 100. For example, in some embodiments, display subsystem 108 includes graphics processors (GPUs), graphics cards, and/or display screens that are used for displaying the information.

In some embodiments, communication paths (that include one or more buses, wires, and/or connections) are coupled between the functional blocks in electronic device 100 (processing subsystem 102, memory subsystem 104, etc.), as shown by arrow-headed lines between the elements. The communication paths are used to transmit commands, data, event notifications, and/or other information between the elements.

Although specific components are used to describe electronic device 100, in some embodiments, different components and/or subsystems may be present in electronic device 100. For example, electronic device 100 may include one or more additional processing subsystems 102, memory subsystems 104, etc. Additionally, one or more of the subsystems may not be present in electronic device 100 or some or all of the subsystem's functions may be incorporated in the other subsystems. Moreover, in some embodiments, electronic device 100 may include one or more additional subsystems that are not shown in FIG. 1. For example, electronic device 100 can include, but is not limited to, a data collection subsystem, an audio and/or video subsystem, an alarm subsystem, a media processing subsystem, and/or an input/output (I/O) subsystem.

Electronic device 100 can be, or can be included in, any device that performs computational operations. For example, electronic device 100 can be, or can be included in, a desktop computer, a laptop computer, a wearable computing device, a tablet computer, a smart phone, a server, a network appliance, a toy, audio-visual equipment (e.g., a receiver, set top box, Apple TV, etc.), automobiles (e.g., a car interface system, navigation system, heads-up display, etc.), home appliances, controllers, etc., and/or combinations thereof. (Apple TV is a registered trademark of Apple Inc. of Cupertino, Calif.).

Network Environment

Figure 2:
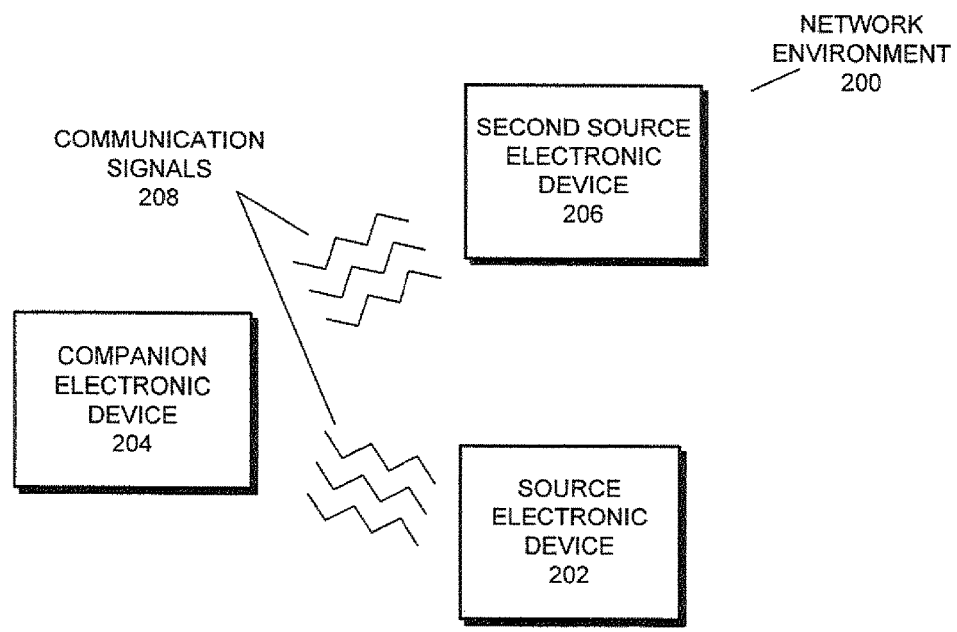
FIG. 2 presents a block diagram illustrating a network environment in accordance with some embodiments.

FIG. 2 presents a block diagram illustrating a network environment in accordance with some embodiments. As can be seen in FIG. 2, network environment 200 includes source electronic device 202, companion electronic device 204, and second source electronic device 206 (referred to collectively as "the electronic devices"). In some embodiments, each of the electronic devices is an electronic device similar to electronic device 100, i.e., has similar subsystems to electronic device 100. However, this is not required; the described embodiments can use any electronic devices that can perform the operations herein described.

Source electronic device 202 and second source electronic device 206 are electronic devices that participate in exchanges of communications with companion electronic device 204 relating to activity transfer operations. In some embodiments, source electronic device 202 (and/or second source electronic device 206) is an electronic device that is recognized by companion electronic device 204 and therefore is allowed to participate in an activity transfer operation. For example, both source electronic device 202 and companion electronic device 204 may have been registered with a service provider using the same account and may therefore recognize each other via information stored in each electronic device. For example, in some embodiments, source electronic device 202 and companion electronic device 204 participate in (and recognize each other via information acquired through) a preliminary pairing operation, e.g., a predefined pairing, as described in pending U.S. patent application Ser. No. 14/474,466, which is titled "Predefined Wireless Pairing," by inventors Jason C. Conn, Akshay Mangalam Srivatsa, Craig P. Dooley, and Michael Giles, and filed on 2 Sep. 2014, the contents of which are incorporated by reference as described above. In some embodiments, source electronic device 202 and companion electronic device 204 may participate in a device-to-device exchange of identification factors (encryption keys, certificates, etc.) so that source electronic device 202 and companion electronic device 204 subsequently recognize each other.

Within network environment 200, companion electronic device 204 can communicate with source electronic device 202 and second source electronic device 206 using wireless communication signals 208 (illustrated using jagged lines labeled "COMMUNICATION SIGNALS 208" in FIG. 2). In some embodiments, communication signals 208 are formatted and exchanged (broadcast, transmitted/received, etc.) in accordance with a corresponding wireless protocol—for example, via a wireless network protocol such as Bluetooth, ZigBee, an 802.11-based protocol and/or other wireless network protocols. In some embodiments, some or all of communication signals 208 are communicated as wired communication signals, e.g., signals in wired Ethernet, a wired LAN, a wired WAN, etc.

In some embodiments, the activity transfer operations described herein rely on source electronic device 202 and companion electronic device 204 being sufficiently close to each other to enable communication signals 208 (and thus the incorporated messages) sent by each electronic device to be received by the other electronic device. In other words, source electronic device 202 and companion electronic device 204 are in "proximity" to one another, thereby enabling the exchange of messages between the electronic devices. "Proximity" as used herein therefore represents distance(s) at which messages broadcast/sent from a given electronic device can be received by one or more other electronic devices. This distance is dictated by radio equipment (antennas, receivers/transmitters, etc.) in the electronic devices and the particular radio protocol/signals used to broadcast/send the messages, as limited by factors such as environmental conditions (electromagnetic interference, etc.), intermediate objects (furniture, walls, clothing/bags, etc.), etc. For example, in some embodiments, communication signals 208 are exchanged between source electronic device 202 and companion electronic device 204 using a protocol with an expected range of 30 meters, and thus the devices are "in proximity" when the devices are within 30 meters of one another (note, however, that the expected range may be significantly altered by the above-described factors).

Figure 17:
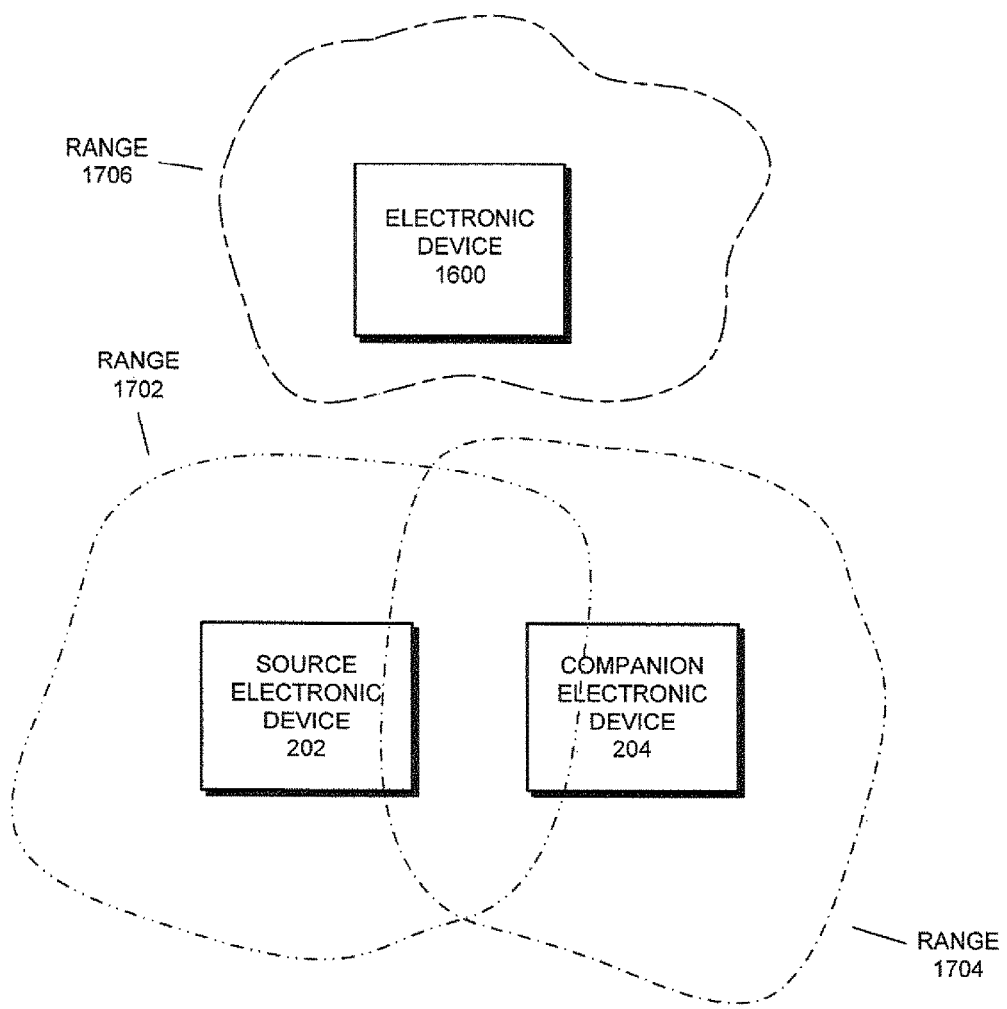
FIG. 17 presents a block diagram illustrating electronic devices in proximity to one another in accordance with some embodiments.

FIG. 17 presents a block diagram illustrating electronic devices in proximity to one another in accordance with some embodiments. As can be seen in FIG. 17, companion electronic device 204 is within range 1702 for radio signals (e.g., communication signals 208) for source electronic device 202, meaning that companion electronic device 204 can receive radio signals sent from source electronic device 202. In addition, source electronic device 202 is within range 1704 for radio signals (e.g., communication signals 208) for companion electronic device 204, meaning that source electronic device 202 can receive radio signals sent from companion electronic device 204. As described above, therefore, source electronic device 202 and companion electronic device 204 are "in proximity" to one another, thereby enabling the communication of messages (and corresponding operations) herein described. However, neither source electronic device 202 nor companion electronic device 204 is within range 1706 for radio signals for electronic device 1700, meaning that neither source electronic device 202 nor companion electronic device 204 is in proximity to electronic device 1700. Note that ranges 1702-1706 in FIG. 17 are shown using irregular shapes, thereby illustrating that radio signals from the electronic devices have irregular ranges, depending on the electronic device (antenna arrangement, etc.), the above-described factors, etc.

In some embodiments, the messages, data, etc. communicated between the electronic devices are encrypted. In these embodiments, some or all of the electronic devices perform corresponding encryption and decryption operations, e.g., by using a shared key, keys derived from a shared key, and/or a one-time key. For example, as described earlier, in some embodiments, source electronic device 202 and companion electronic device 204 participate in a predefined pairing as described in pending U.S. patent application Ser. No. 14/474,466, which is titled "Predefined Wireless Pairing," by inventors Jason C. Conn, Akshay Mangalam Srivatsa, Craig P. Dooley, and Michael Giles, and filed on 2 Sep. 2014, the contents of which are incorporated by reference as described above. In some embodiments, source electronic device 202 and companion electronic device 204 encrypt and decrypt messages exchanged for activity transfer operations by using one or more encryption keys that source electronic device 202 and companion electronic device 204 acquire while participating in the predefined pairing.

Although various electronic devices are shown in FIG. 2, in some embodiments different arrangements of electronic devices are used to perform some or all of the operations herein described. For example, in some embodiments, second source electronic device 206 is not present. Generally, the described embodiments include sufficient devices to transition an activity between electronic devices as described herein.

Broadcasting an Activity Advertisement Message

Figure 3:
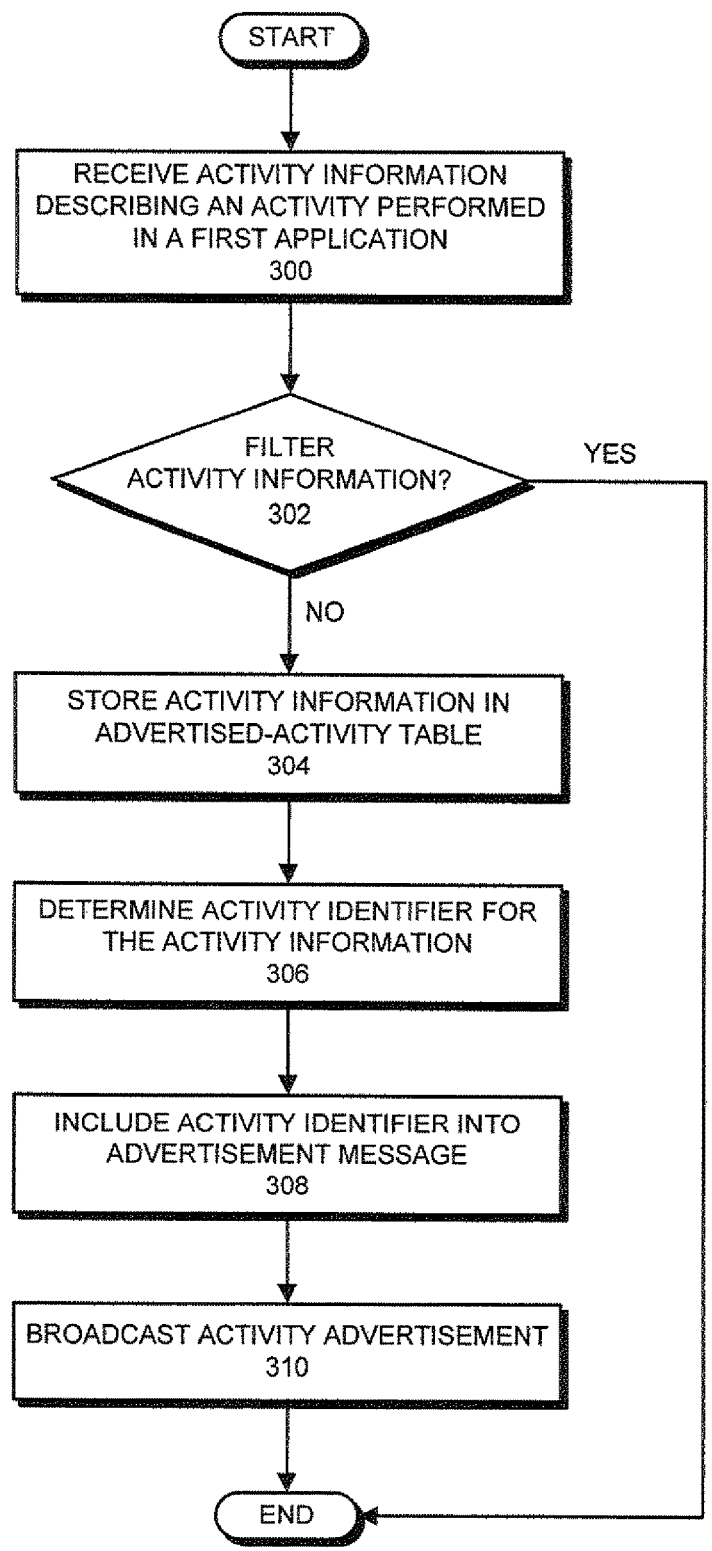
FIG. 3 presents a flowchart illustrating a process for broadcasting an activity advertisement message in accordance with some embodiments.

FIG. 3 presents a flowchart illustrating a process for broadcasting an activity advertisement message in accordance with some embodiments. More specifically, during the process shown in FIG. 3, an electronic device such as source electronic device 202 broadcasts an activity advertisement message. Note that the operations shown in FIG. 3 are presented as a general example of operations performed by some embodiments. The operations performed by some embodiments include different operations and/or operations that are performed in a different order. Additionally, although certain mechanisms are used in describing the operations (e.g., source electronic device 202, etc.), in some embodiments, other mechanisms perform the operations. For example, one or both of companion electronic device 204 and second source electronic device 206 may perform similar operations to broadcast an activity advertisement message for themselves.

The process shown in FIG. 3 starts when source electronic device 202 receives activity information that describes an activity performed in a first application at source electronic device 202, i.e., a first application installed on/available at source electronic device 202 (step 300). (Examples of activity information are described in more detail below with reference to FIG. 11). In some embodiments, the first application provides or reports the activity information to source electronic device 202, e.g., provides or reports the activity information to an operating system, a daemon, or other process and/or service at source electronic device 202. In some embodiments, source electronic device 202 queries the first application for the activity information. Generally, activity information includes information that describes an activity performed at least partially using an electronic device. Examples of activities include reading and/or editing a document (e.g., a word processing document, spreadsheet, presentation, or other type of document), composing an email message, drafting a note, accessing (browsing) a website, watching a movie, playing an audio file, or otherwise using an application or app to perform corresponding operations.

Next, source electronic device 202 determines whether to filter the received activity information (step 302), which includes using one or more criteria to discard activity information that is not to undergo further processing and/or not to be broadcast in an activity advertisement message. For example, source electronic device 202 may measure a frequency at which the first application provides updates to the activity information, and may discard activity information from the first application when the frequency at which the activity information is updated exceeds a threshold (which may be referred to as "throttling" the activity information from the first application). As another example, source electronic device 202 may discard activity information that is duplicative or repetitive, that does not contain significant changes to previously reported activity information (e.g., automatic reports of "no change," reports of simple/basic operations/changes, etc.), that reports facts already known by source electronic device 202, etc. As yet another example, in some embodiments, source electronic device 202 filters the activity information based on an indication that an activity described by the activity information is not to be advertised. For example, in some embodiments, source electronic device 202 and/or a user of source electronic device 202 may configure certain activities and/or certain kinds of activities as activities that are not to be advertised. As yet another example, in some embodiments, source electronic device 202 ranks some or all activities for which activity information exists (i.e., some or all of the activities that can be advertised) and discards one or more of these activities based on the ranking. For example, source electronic device 202 can assign a higher ranking to activities that a user has previously continued and a lower ranking to activities that a user has previously not continued. In some of these embodiments, source electronic device 202 uses messages from companion electronic device 204 to determine which advertised activities were previously continued and which advertised activities were previously not continued, e.g., messages such as those described below with reference to FIG. 5, step 510.

If source electronic device 202 filters, e.g., discards, the activity information (step 302, yes), the process ends. Otherwise, if source electronic device 202 does not filter the activity information (step 302, no), source electronic device 202 stores some or all of the activity information in a structure (step 304). For illustrative purposes, we describe embodiments that store the activity information in an entry in a table, which we will refer to as the "advertised-activity" table. Note, however, that embodiments are not limited to using a table for storing activity information. Some embodiments use a different storage mechanism/structure for storing the activity information, such as an associative array, a content-addressable memory, etc.

In some embodiments, while storing the activity information, source electronic device 202 overwrites and/or removes activity information previously stored in the advertised-activity table. For example, source electronic device 202 can use a least-recently-used (LRU) algorithm to overwrite and/or remove entries from the advertised-activity table. Examples of advertised-activity tables are described in more detail below with reference to FIG. 12.

Next, source electronic device 202 determines an activity identifier for the activity information (step 306). Generally, the activity identifier includes information from the activity information that identifies the first application and the activity performed in the first application. In some embodiments, source electronic device 202 generates the activity identifier by reducing the activity information into a smaller, encoded representation that can be broadcast more efficiently than the full activity information. In some of these embodiments, the encoded representation is a hash of the activity information, i.e., the output of a hash function (e.g., MD4, MD5, SHA, MurmurHash, etc.) whose input comprises the activity information. In some embodiments, source electronic device 202 stores the activity identifier along with the activity information in the advertised-activity table (or whatever structure source electronic device 202 uses to store the activity information). Examples of activity identifiers are described in more detail below with reference to FIG. 12.

In some embodiments, the activity identifier comprises a representation of a domain name. For example, in some embodiments, when the activity performed in the first application includes using a resource at a domain, the activity information comprises a domain name, e.g., at least a portion of a uniform resource locator (URL), of the domain. In some embodiments, source electronic device 202 determines the activity identifier by including some or all of the domain name in the activity identifier. For example, the activity identifier can be a hash of some or all of the URL for the resource.

In some embodiments, the activity identifier identifies an entry in a structure where source electronic device 202 stored the activity information (e.g., as described above with reference to step 304). For example, the activity identifier can identify the entry in the advertised-activity table where source electronic device 202 stored the activity information. The activity identifier can also include an identifier for the advertised-activity table itself. In some embodiments, to identify the entry in the structure where source electronic device 202 stored the activity information, the activity identifier includes: (1) a hash of the data in the advertised-activity table to identify the advertised-activity table, and (2) an index for the entry in the advertised-activity table that stores the activity information.

Source electronic device 202 next includes the activity identifier into an activity advertisement message (step 308). In some embodiments, the activity advertisement message includes other data in addition to the activity identifier. For example, in some embodiments, the activity advertisement message includes a flag that is used to indicate when the activity identifier includes a representation of domain name for an online resource related to the activity. In these embodiments, source electronic device 202 asserts the flag (e.g., sets the flag to a predetermined value such as 1) to indicate that the activity identifier includes a representation of a domain name. In some embodiments, source electronic device 202 asserts a flag in the activity advertisement message to indicate that the advertised activity can be continued in a way that source electronic device 202 will separately provide to companion electronic device 204, e.g., by source electronic device 202 including corresponding instructions in the extended activity data (extended activity data is described in more detail below).

In some embodiments the activity advertisement message includes a timestamp for the activity/activity information. The timestamp, which can express an absolute time or a relative time, can indicate the time that the activity was last performed in the first application, e.g., the last time that a document was edited, a website was accessed, a movie watched, etc. In some embodiments the timestamp is independent of the activity/activity information, i.e., the timestamp indicates the time that a user last interacted with source electronic device 202, regardless of whether the user's last interaction included the user performing the activity.

Source electronic device 202 then broadcasts the activity advertisement message (step 310). For example, source electronic device 202 can broadcast the activity advertisement message using communication signals 208. In some embodiments, source electronic device 202 broadcasts/advertises the activity advertisement message in network environment 200 so that nearby devices in network environment 200 can receive the activity advertisement message. For example, in these embodiments, source electronic device 202 uses a Bluetooth™ communication channel such as Bluetooth Low Energy (BLE) to broadcast the activity advertisement message. Some embodiments may broadcast the activity advertisement message on a different communication channel, such as a peer-to-peer network, a LAN, the Internet, etc. Note that activity broadcasts can happen more than once, e.g., source electronic device 202 can broadcast the same activity advertisement message multiple times and/or periodically.

Building an Available-Activity Table

In some embodiments, companion electronic device 204 stores available activity information, e.g., activity information describing activities that are available at companion electronic device 204 (examples of activity information are described in more detail below with reference to FIG. 11). For example, in some embodiments, companion electronic device 204 stores activity identifiers for the available activity information. For illustrative purposes, we describe companion electronic device 204 storing the available activity information in a table, which we refer to as the "available-activity" table (examples of available-activity tables are described in more detail later in this disclosure). Note that, although we describe embodiments that store available activity information in an available-activity table, embodiments are not limited to using a table for storing the available activity information. Some embodiments can use other structures for storing the available activity information, such as an associative array, a content-addressable memory, etc.

Figure 4:
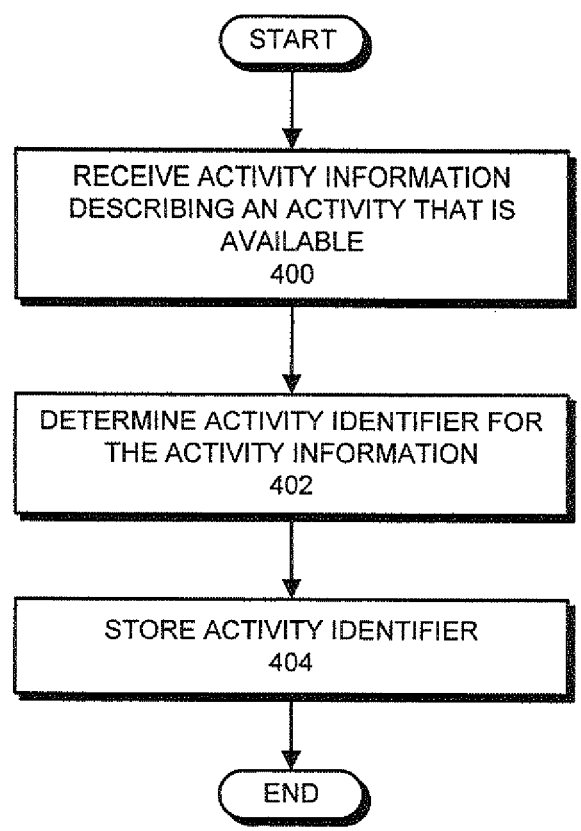
FIG. 4 presents a flowchart illustrating a process for storing activity information describing activities that are available at a companion electronic device in accordance with some embodiments.

FIG. 4 presents a flowchart illustrating a process for storing activity information describing activities that are available at companion electronic device 204 into an available-activity table in accordance with some embodiments. Note that the operations shown in FIG. 4 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations to store available activity information describing activities that are available for themselves.

The process shown in FIG. 4 starts when companion electronic device 204 receives activity information describing an activity that is available at a second application at companion electronic device 204 (step 400), e.g., activity information describing activities that can be performed at companion electronic device 204. Generally, this activity information describes an activity that can be performed in the second application at companion electronic device 204, i.e., an operation or function that the second application at companion electronic device 204 is able to perform. In some embodiments, the second application reports/provides the activity information as the second application is installed and/or used. In some embodiments, companion electronic device 204 queries or otherwise monitors the second application to collect the activity information that describes the activity that is available at the second application. In some embodiments, the activity information includes activity information for activities that have not been performed on companion electronic device 204, but that are available to be performed (e.g., activity information reported by the second application as the second application is installed/updated, launched, used, etc. at companion electronic device 204).

Next, companion electronic device 204 determines a second activity identifier, i.e., an activity identifier for the activity information that describes the activity that is available at the second application (step 402). Generally, the second activity identifier identifies the second application and the activity that is available at the second application. The second activity identifier can be an encoded representation of the activity information that describes the activity that is available at the second application. In some embodiments, companion electronic device 204 determines the second activity identifier by performing some or all of the same operations that source electronic device 202 performs to generate the activity identifier for the activity performed in the first application (see FIG. 3, step 306). For example, in some embodiments companion electronic device 204 uses the same hash function to generate the second activity identifier that source electronic device 202 uses to generate the activity identifier for the activity performed in the first application.

In some embodiments, when the second application can perform an activity that includes accessing a resource at a domain, the activity information for this activity includes a domain name for the domain. In some of these embodiments, the second activity identifier is an encoded representation of the domain name, which enables the second application to "claim" the domain name, i.e., to declare that the second application can use resources at the domain name so that companion electronic device 204 can transfer corresponding activities to the second application. For example, as will be described later, in a scenario where the second application streams movies from a specific site on the Internet, the second activity identifier can be an encoded representation of at least some part of the domain name for the site. Note that the second application can be different from the first application, i.e., the application whose activity is advertised in the activity advertisement message, enabling an application different from the first application to continue the activity at companion electronic device 204.

Figure 5:
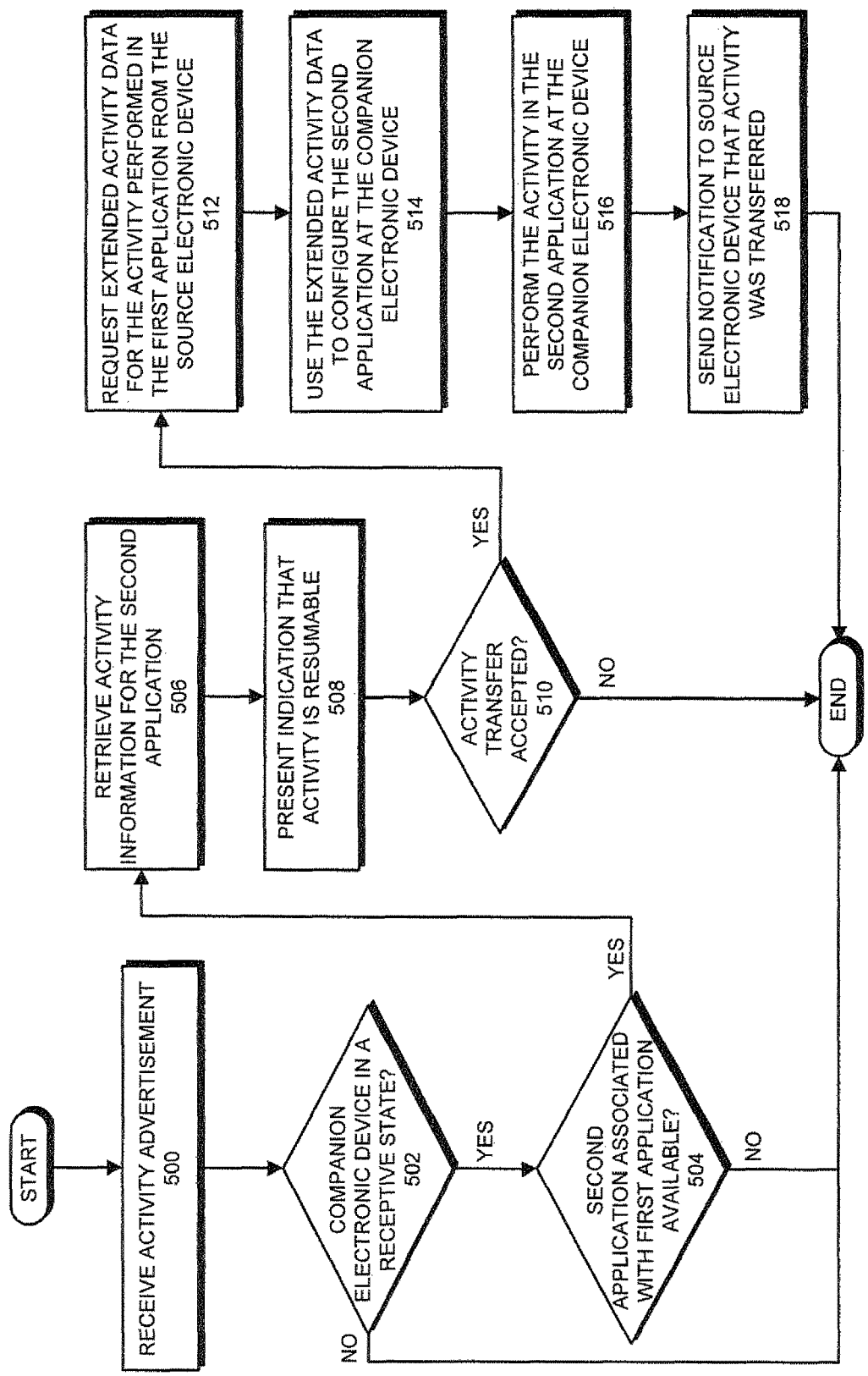
FIG. 5 presents a flowchart illustrating a process for requesting extended activity data and transferring an activity in accordance with some embodiments.

Next, companion electronic device 204 stores the second activity identifier into the available-activity table (step 404).
Requesting Extended Activity Data and Transferring Activity In some embodiments, upon receiving an activity advertisement message, an electronic device can request extended activity data for the advertised activity so that the advertised activity can subsequently be transferred to the electronic device. FIG. 5 presents a flowchart illustrating a process for requesting extended activity data and transferring an activity in accordance with some embodiments. More specifically, during the process shown in FIG. 5, companion electronic device 204 requests, from source electronic device 202, extended activity data for an activity performed in a first application in source electronic device 202. Note that the operations shown in FIG. 5 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204), in some embodiments, other electronic devices and/or mechanisms perform the operations.

The process shown in FIG. 5 starts when companion electronic device 204 receives an activity advertisement message (step 500), e.g., the activity advertisement message broadcast from source electronic device 202 (see FIG. 3, step 310). Next, companion electronic device 204 determines whether companion electronic device 204 is in a receptive state (step 502). Generally, companion electronic device 204 is in a receptive state when it is available for performing an activity transfer. For example, in some embodiments, companion electronic device 204 transitions to a receptive state when the device "wakes-up," e.g., while displaying a lock screen after a user presses a button to wake-up the device. In some embodiments, companion electronic device 204 is not in a receptive state when companion electronic device 204 is in use, e.g., when a user is using an application at companion electronic device 204 and/or when the user has used an application within a given period of time.

If companion electronic device 204 is not in a receptive state (step 502, no), the process ends (i.e., the activity advertisement message is ignored). Otherwise, if companion electronic device 204 is in a receptive state (step 502, yes), companion electronic device 204 determines whether a second application that is associated with the first application is available at companion electronic device 204 (step 504). Generally, this operation includes determining if an application is available on companion electronic device 204 for continuing the activity described in the activity advertisement message from source electronic device 202. Determining whether the second application is available is described in more detailed later with reference to FIGS. 7-8.

If the second application is not available (step 504, no), the process ends. Otherwise, if the second application is available (step 504, yes), companion electronic device 204 retrieves activity information for the second application (step 506). For example, as will also be described in more detail with reference to FIGS. 7-8 and 11-12, after determining the second application, companion electronic device 204 can use the activity identifier for the second application to retrieve activity information that describes the activity that is available in the second application from the available-activity table (or from another structure that companion electronic device 204 uses to store available activity information). In some embodiments, companion electronic device 204 uses the retrieved activity information, e.g., uses an application identifier in the retrieved activity information, to customize an indication that the activity is resumable, e.g., as described below with reference to step 508 and/or FIG. 14. Application identifiers are described in more detail with reference to FIG. 11.

Next, companion electronic device 204 presents an indication that the activity is resumable (step 508). For example, companion electronic device 204 can present a graphical icon and/or notification in a display of companion electronic device 204. Indications are described in more detail below with reference to FIG. 14.

Then, companion electronic device 204 determines whether the activity transfer was accepted (step 510). In some embodiments, a user of companion electronic device 204 accepts and/or rejects the activity transfer by performing an action with the indication, such as clicking on the indication, dragging the indication in one or more directions and/or to one or more specific locations, etc. For example, to accept the activity transfer, a user can tap the icon/notification with a finger (on a touch screen display) and drag the icon/notification in a first direction (e.g., left to right, upward, clockwise in a circle, etc.). As another example, to reject an activity, a user can tap the icon/notification with a finger and drag the icon/notification in a second direction (e.g., right to left, downward, counterclockwise in a circle, etc.). In some embodiments, companion electronic device 204 determines that the activity transfer was not accepted based on a time-out period, i.e., by determining that a period of time has passed since the indication was presented without the user performing the action to accept the indication/activity transfer.

If the activity transfer is not accepted (step 510, no), the process ends. Note that, in some embodiments, if the activity transfer is not accepted, companion electronic device 204 sends a message to source electronic device 202 to indicate that the activity transfer was not accepted. If the activity transfer is accepted (step 510, yes), companion electronic device 204 sends a message to source electronic device 202 to request extended activity data for the activity performed in the first application (step 512). Generally, the request for extended activity data includes information to facilitate source electronic device 202 determining the activity for which the extended data is being requested. For example, in some embodiments companion electronic device 204 includes the activity identifier from the activity advertisement message with the request for extended activity data.

Next, upon receiving extended activity data from source electronic device 202 in response to the request for extended activity data, companion electronic device 204 configures the second application using the extended activity data (step 514). Configuring the second application can include launching/starting the second application, setting a state (or causing a change to the state) of the second application based on the extended activity data, and otherwise configuring the second application to perform a corresponding operation. For example, companion electronic device 204 can pass a document/resource identifier, information representing the document/resource, and/or a reference to the document/resource in the extended activity data to the second application to cause the second application access to the document/resource (e.g., an identifier for/information representing/a reference to a cloud-stored document for the second application to access from cloud-based storage located on the Internet, an identifier for/information representing/a reference to a document for the second application to access from a database, etc.). In some embodiments, when the activity includes composing a document that is stored at source electronic device 202, the extended activity data includes the document or information representing the document, thereby enabling companion electronic device 204 and/or the second application to use/re-create the document at companion electronic device 204 for the second application. In some embodiments, the extended activity data includes edits in a document, e.g., the position and/or content of edits made in a document. In some embodiments, the extended activity data includes position information, such as the last played/viewed/recorded position in a media file (i.e, the position in the media file where playback or recording stopped or was last performed), the position of a marker in a file, the position/state of gameplay in a video game (e.g., the last level played, coordinates to a place that the player was last at, points and/or achievements earned, and/or information that can be used to recreate the state of a game played on source electronic device 202 at companion electronic device 204), etc.

Then, companion electronic device 204 commences performing the activity in the second application (step 516), which generally includes starting/launching the second application at companion electronic device 204 (if the second application was not already running) and executing the second application at companion electronic device 204 based on the extended activity data. For example, companion electronic device 204 can cause the second application to start executing in a viewing and/or editing mode for the document related to the advertised activity, and can cause the second application to scroll to the last position in the document that the document was viewed/edited at source electronic device 202. Next, companion electronic device 204 sends a notification to source electronic device 202 indicating that the activity was transferred (step 518).

Note that some embodiments can use information in the activity advertisement message, e.g., the activity identifier, to start configuring the second application while the extended activity data is being transmitted, or even before the extended activity data is requested. Some of these embodiments use the information in the activity advertisement message to set an initial background for the second application, to set a mode for the second application (e.g., an editing mode, a read-only mode, an email composition mode, a note composition mode, etc.). Hence, some embodiments can launch and/or configure the second application before the extended activity data is received, possibly as soon as the activity transfer is accepted, thereby improving performance in slow networks by hiding data transfer time with application launch time.

In some embodiments, companion electronic device 204 sends the request for extended activity data using different signals than communication signals 208, and/or by using a different communication channel/network interface than the one the activity advertisement message was received on. For example, companion electronic device 204 can receive the activity advertisement message over a Bluetooth link (using the BLE protocol) and can request the extended activity data over a Wi-Fi link or the Internet. In these embodiments, source electronic device 202 and companion electronic device 204 use communication signals 208, e.g., the Bluetooth link, to exchange information that enables the electronic devices to communicate over the different communication channel/network. For example, in some of these embodiments, companion electronic device 204 creates a peer-to-peer network (e.g., an ad-hoc Wi-Fi network) and provides information to access the peer-to-peer network to source electronic device 202. In some embodiments, source electronic device 202 provides the extended activity data to a server and companion electronic device 204 receives the extended activity data from the server, e.g., through the Internet.

Transitioning to a Receptive State Based on Advertising Information

Although in FIG. 5 we describe embodiments that receive an activity advertisement message (FIG. 5, step 500) and determine whether companion electronic device 204 is in a receptive state (FIG. 5, step 502), some embodiments transition to a receptive state based on information in received activity advertisement messages. In some of these embodiments, after receiving an activity advertisement message (e.g., as shown in FIG. 5, step 500), companion electronic device 204 does not determine whether companion electronic device 204 is in a receptive state, i.e., the process shown in FIG. 5 proceeds from step 500 to step 504 without performing operations for step 502.

For example, in some embodiments, source electronic device 202 uses a low-power protocol such as Bluetooth low-energy (BLE), ZigBee, etc. to broadcast the activity advertisement message with corresponding communication signals 208. Devices such as companion electronic device 204 may monitor for activity advertisement messages broadcast from source electronic device 202 using corresponding low-power mechanisms, such as a baseband processor within a corresponding network interface, e.g., a baseband processor in networking subsystem 106. In some of these embodiments, the receiving of the activity advertisement message is handled by companion electronic device 204 using only a baseband processor for companion electronic device 204, which means that companion electronic device 204 may otherwise be in an idle state (e.g., with subsystems such as the processing subsystem in a low-power state). For example, in some embodiments, companion electronic device 204 may be a smart phone in a user's pocket in an idle state in which a baseband processor monitors for activity advertisement messages while the processing subsystem (and companion electronic device 204 generally) is in a low-power state.

In some embodiments, upon recognizing the activity advertisement message as such, the baseband processor wakes the processing subsystem (and may generally transition companion electronic device 204 out of the idle operating state to a higher-power/more active operating state) to perform subsequent operations. For example, in some embodiments, companion electronic device 204 may monitor for activity advertisement messages and react to activity advertisement messages as is described in pending U.S. patent application Ser. No. 14/475,329, which was filed on 2 Sep. 2014, which is titled "Operating-Mode Transitions based on Advertising Information," by inventors Craig P. Dooley, Akshay Mangalam Srivatsa, Anjali S. Sandesara, and Michael Giles, and which is incorporated by reference as described above. In some embodiments, companion electronic device 204/the smart phone may not need to be retrieved from the user's pocket and activated to place companion electronic device 204 in a receptive state.

Responding to a Request for Extended Activity Data

Figure 6:
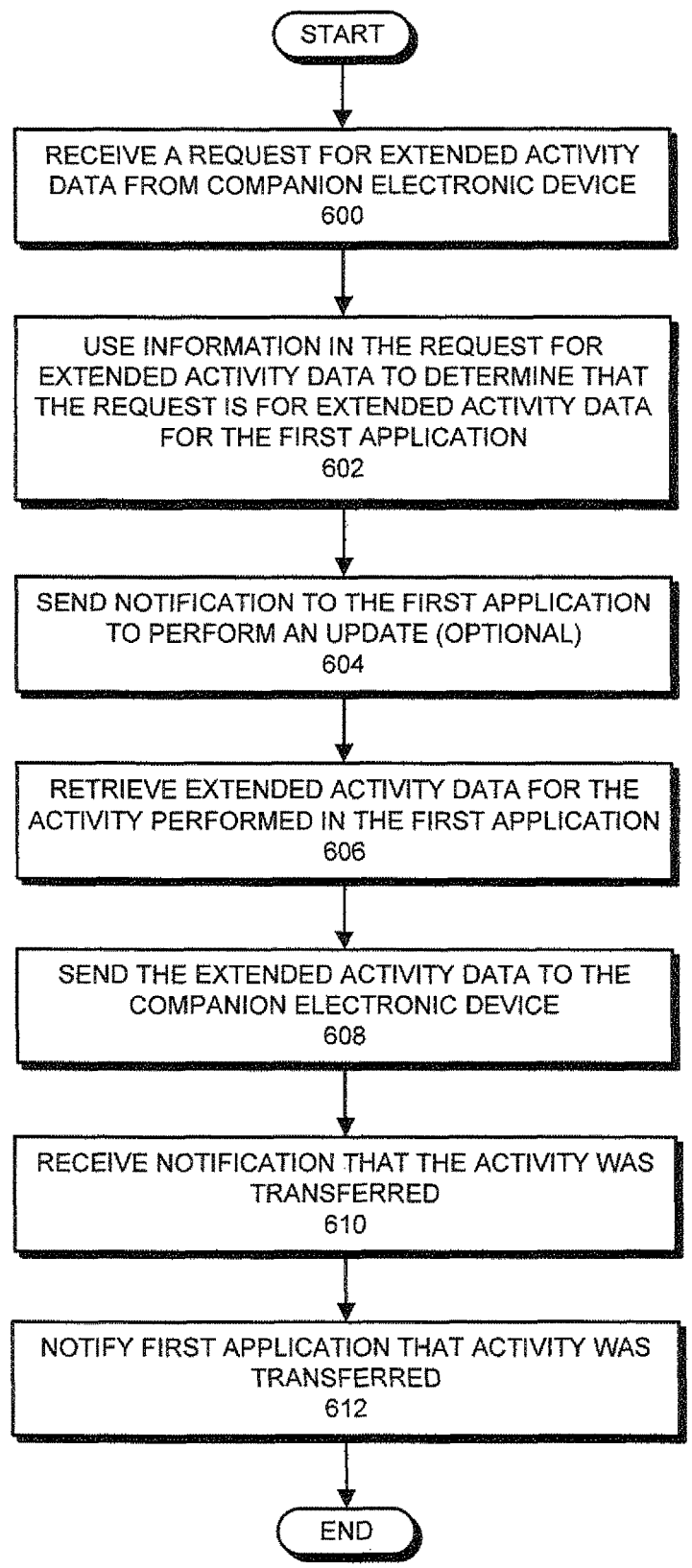
FIG. 6 presents a flowchart illustrating a process for responding to a request for extended activity data in accordance with some embodiments.

FIG. 6 presents a flowchart illustrating a process for responding to a request for extended activity data in accordance with some embodiments. More specifically, during the process shown in FIG. 6, an electronic device such as source electronic device 202 responds to a request for extended activity data from an electronic device such as companion electronic device 204. Note that the operations shown in FIG. 6 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204), in some embodiments, other electronic devices and/or mechanisms perform the operations.

The process shown in FIG. 6 starts when source electronic device 202 receives a request for extended activity data (step 600), e.g., the request for extended activity data that companion electronic device 204 transmitted, as described with reference to step 512 in FIG. 5.

Next, source electronic device 202 uses information in the request for extended activity data to determine that the request is for extended activity data for the first application (step 602). For example, as described earlier, the request for extended activity data can include the activity identifier from the activity advertisement message (see step 308 in FIG. 3). In some embodiments, source electronic device 202 performs a lookup for the activity identifier in the advertised-activity table (or other structure where advertised activity information is stored; examples of advertised-activity tables are described in more detail below with reference to FIG. 12). When source electronic device 202 finds an entry in the advertised-activity table that includes the activity identifier from the activity advertisement message, source electronic device 202 can retrieve the activity information for the entry to determine that the activity identifier corresponds to the first application, e.g., by determining that the application identifier for the entry is the application identifier for the first application (examples of activity information and application identifiers are described in more detail with reference to FIGS. 11-12).

Next, source electronic device 202 optionally sends a notification/request to the first application to perform an update related to the activity (step 604). In some embodiments, the notification causes the first application to update the extended activity data before providing the extended activity data to companion electronic device 204. For example, the first application can use the notification to update the last scroll/viewed position for a document related to the activity and/or to perform finalizing operations related to the activity before the activity is transferred, such as saving a document related to the activity, updating the extended activity data with the latest draft of a document related to the activity, etc.

Then, source electronic device 202 retrieves the extended activity data for the first application (step 606). In some embodiments, source electronic device 202 requests that the first application provide the extended activity data. In some embodiments, the first application provides some or all of the extended activity along with the initial activity information (see FIG. 3, step 300) and/or periodically reports extended activity information (e.g., reports every N seconds, where N is a number such as 1, 3, etc., reports extended activity information each time an event happens for the first application, such as when a document is saved in the first application, a movie being watched is paused in the first application, etc.).

Next, source electronic device 202 sends the extended activity data to companion electronic device 204 (step 608). Generally, the extended activity data includes information that can be used to configure the second application to continue the activity, such as a document identifier that identifies a document used for the activity performed in the first application (and/or information representing the document, such as a reference to the document), a uniform resource location (URL) of web page accessed/browsed in the first application (and/or information representing the web page/URL, such as a reference to the web page/URL), position information (e.g., an indication of the last viewed/scrolled position in the document or the web page, the last played position in a video game, etc.), a copy of a draft document stored at source electronic device 202 and/or in a storage device accessible on the Internet (e.g., "cloud storage") or a corporate network (and/or information representing the draft document, such as a reference to the draft document), etc.

Then, source electronic device 202 receives a notification that the activity was transferred (step 610), e.g., receives the notification sent by companion electronic device 204 as described with reference to FIG. 5, step 518. In some embodiments, in response to receiving the notification, source electronic device 202 notifies the first application that the activity was transferred (step 612). In some embodiments, source electronic device 202 and/or the first application performs one or more operations related to the activity based on receiving the notification, e.g., housekeeping tasks such as deleting a locally-stored document/document draft, closing an open document, shutting down the application, etc.

In some embodiments, source electronic device 202 provides the extended activity data using different signals than communication signals 208, and/or by using a different communication channel/network interface than the one the activity advertisement message and/or the request for extended activity data was communicated on. For example, source electronic device 202 can receive the request for extended activity data over a Bluetooth link and can provide the extended activity data over a Wi-Fi link or the Internet.

Secure Communication Using Cloud Pairing

As discussed earlier, in some embodiments, electronic devices that perform activity transfer operations participate in a preliminary pairing operation, e.g., a "cloud pairing" operation, such as the predefined pairing described in pending U.S. patent application Ser. No. 14/474,466, which is titled "Predefined Wireless Pairing," by inventors Jason C.

Conn, Akshay Mangalam Srivatsa, Craig P. Dooley, and Michael Giles, filed on 2 Sep. 2014, the contents of which are incorporated by reference as described above. In some embodiments, electronic devices encrypt and decrypt messages exchanged with each other for performing activity transfer operations using security information acquired during the cloud pairing operation, e.g., using encryption keys acquired during the cloud pairing operation.

For example, in some embodiments, source electronic device 202 encrypts the activity advertisement message (see FIG. 3, step 310) and/or the extended activity data (see FIG. 6, step 608) using an encryption key acquired during the cloud pairing operation that source electronic device 202 performs with companion electronic device 204. In some embodiments, companion electronic device 204 encrypts the request for extended activity data (see FIG. 5, step 512) and/or the notification that the activity was transferred (see FIG. 5, step 518) using the same security information, different security information acquired during the cloud pairing operation that companion electronic device 204 performs with source electronic device 202, and/or information derived from security information acquired during the cloud pairing operation.

Determining the Second Application Using an Activity Identifier

Figure 7:
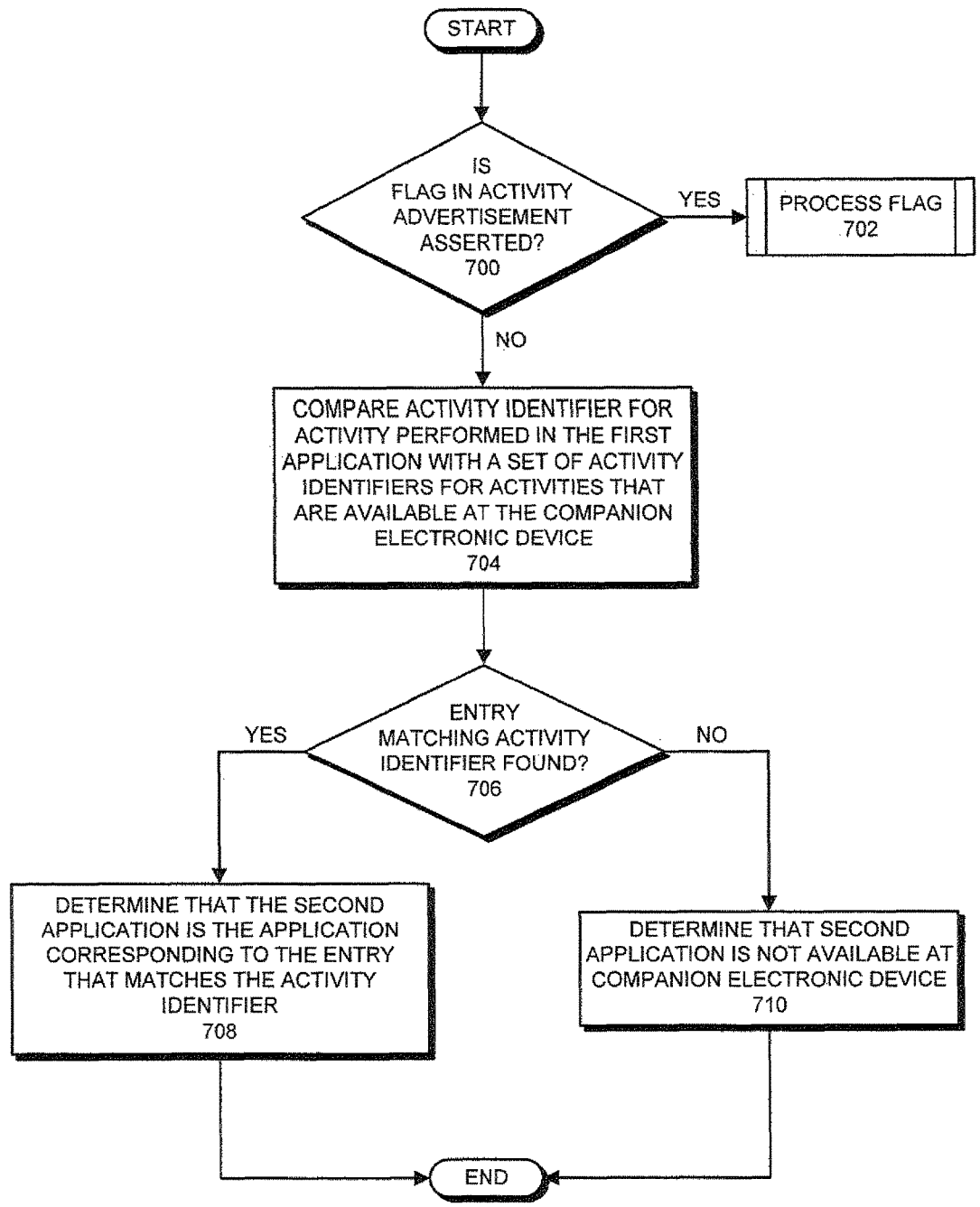
FIG. 7 presents a flowchart illustrating a process for determining whether the second application is available at a companion electronic device in accordance with some embodiments.

As described earlier, in some embodiments, an electronic device determines whether a second application that is associated with a first application is available in the electronic device (to facilitate a possible transfer of an activity to the electronic device). FIG. 7 presents a flowchart illustrating a process for determining whether a second application is available at companion electronic device 204 in accordance with some embodiments. The operations shown in FIG. 7 can be performed during the process shown in FIG. 5, e.g., at step 504. Note that the operations shown in FIG. 7 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations to determine for themselves whether a second application is available.

The process shown in FIG. 7 begins when companion electronic device 204 determines whether a flag in the activity advertisement message is asserted (step 700). As described earlier, in some embodiments, source electronic device 202 asserts a flag in the activity advertisement message to indicate that the activity identifier is/comprises a representation of a domain name for the advertised activity. In some of these embodiments, companion electronic device 204 determines that the activity advertisement message comprises a representation of a domain name by determining that the flag is asserted. Flags are described in more detail later in this description, e.g., with reference to FIGS. 11 and 13.

If a flag in the activity advertisement message is asserted (step 700, yes), companion electronic device 204 processes the flag (step 702). The processing of the flag which takes place at step 702 is described later with reference to FIG. 8. Some embodiments repeat step 702 (i.e., the processing described with reference to FIG. 8) for each asserted flag in the activity advertisement message, e.g., repeat the processing for each asserted flag when the activity advertisement message comprises two or more asserted flags.

If the activity advertisement message does not comprise a flag that is asserted (step 700, no), companion electronic device 204 compares the activity identifier from the activity advertisement message to activity identifiers for activities that are available at companion electronic device 204 (step 704). For example, companion electronic device 204 can look up the activity identifier from the activity advertisement message in activity identifiers in the available-activity table at companion electronic device 204 (or other structure where companion electronic device 204 stores available activity information, as described earlier with reference to FIG. 4).

If the lookup for the activity identifier finds a match in an entry in the available-activity table (step 706, yes), companion electronic device 204 determines that the second application is the application whose activity identifier is stored in that entry (step 708).

If the lookup for the activity identifier does not find a match in the available activity information (step 706, no), companion electronic device 204 determines that an application associated with the first application is not available at companion electronic device 204 (step 710).

Determining the Second Application Using a Flag

Figure 8:
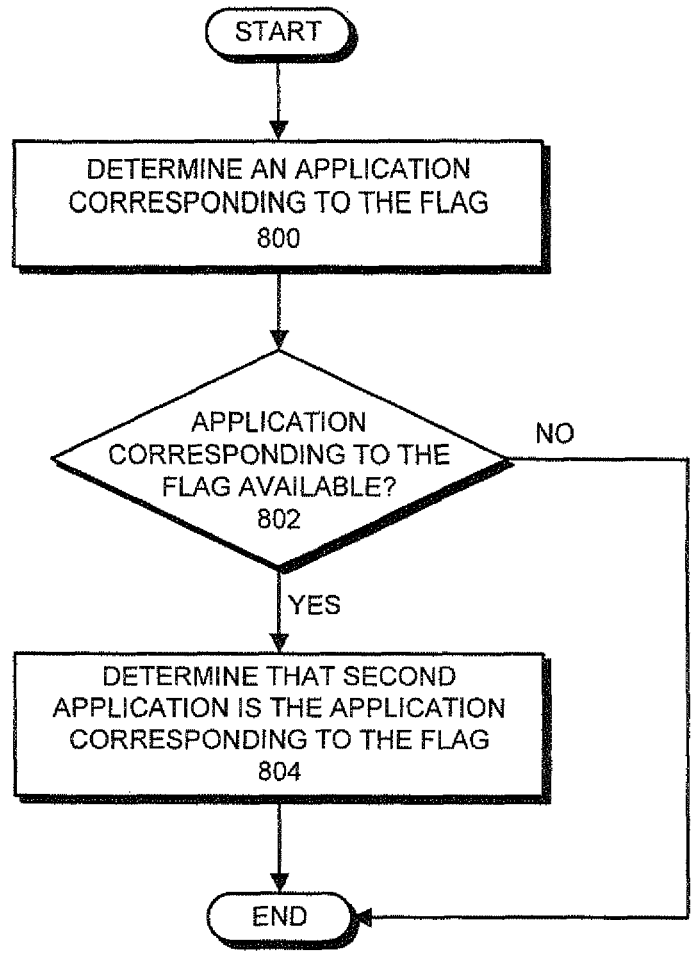
FIG. 8 presents a flowchart illustrating a process for determining the second application using a flag in accordance with some embodiments.

As described earlier, some embodiments assert a flag in the activity advertisement message. FIG. 8 presents a flowchart illustrating a process for determining the second application using a flag in accordance with some embodiments. More specifically, FIG. 8 presents a flowchart illustrating a process that companion electronic device 204 performs at step 702 of FIG. 7. Note that the operations shown in FIG. 8 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations for themselves.

The process shown in FIG. 8 begins when companion electronic device 204 determines an application corresponding to the flag (step 800). In some embodiments, companion electronic device 204 uses the position of the asserted flag and/or the value of the flag to determine the application corresponding to the flag. For example, when the activity advertisement message includes more than one flag that can be asserted, each of the flags can be used to identify a different application that can be used to continue the activity. In some embodiments, the flag is a multi-bit field and different values of the multi-bit field identify a different application. In some embodiments, companion electronic device 204 stores a mapping that identifies the application that the position/value of the flags corresponds to.

Next, companion electronic device 204 determines whether the application corresponding to the flag is available at companion electronic device 204 (step 802). For example, companion electronic device 204 can check whether the application corresponding to the flag is installed at companion electronic device 204. In some embodiments, step 802 is not performed/is skipped, so that the process shown in FIG. 8 continues from step 800 to step 804. For example, step 802 is not performed in embodiments that use flags to identify only pre-installed applications that are known to be available at companion electronic device 204 and cannot be uninstalled by a user.

If the application corresponding to the flag is available (step 802, yes), companion electronic device 204 determines that the second application is the application corresponding to the flag (step 804). The process then ends, which can include continuing to step 506 in FIG. 5.

If the application corresponding to the flag is not available at companion electronic device 204 (step 802, no), the process ends. At this point, companion electronic device 204 can determine that the second application is not available (e.g., as in FIG. 5, step 504, no), or can continue to step 704 in FIG. 7 to determine whether the second application is available by using the activity identifier from the activity advertisement message.

In some embodiments, the process shown in FIG. 8 allows an application different than the first application to continue the activity at companion electronic device 204. For example, consider the case where the first application is a web browser and the activity performed in the first application includes browsing a social-media website. In this example, the second application can be a social-media app that accesses resources (e.g., social media user pages, etc.) accessed in the first application/web browser (i.e., the second application is an app and not a web browser). By using the flag, these embodiments can configure the social-media app to continue the activity that was being performed at the social-media website, at the same point where the web browser left off. As another example, in some embodiments, the first application is a standalone media-streaming app that streams a movie from a website (such as a media player app) and the second application is a web browser than can stream the movie. By using the flag, these embodiments configure the web browser to continue playing the movie, which can include using the extended activity data for the activity to cause the web browser to continue playing the movie where the media-streaming app left off.

In some embodiments, source electronic device 202 sets a second flag (or a different value for the flag) in the activity advertisement message to indicate that source electronic device 202 will subsequently provide instructions/information on how to continue the activity at companion electronic device 204. In some embodiments, the application corresponding to the flag comprises the instructions/information on how to continue the activity at companion electronic device 204. In some embodiments, the extended activity data provides the instructions/information for continuing the activity at companion electronic device 204.

Figure 9:
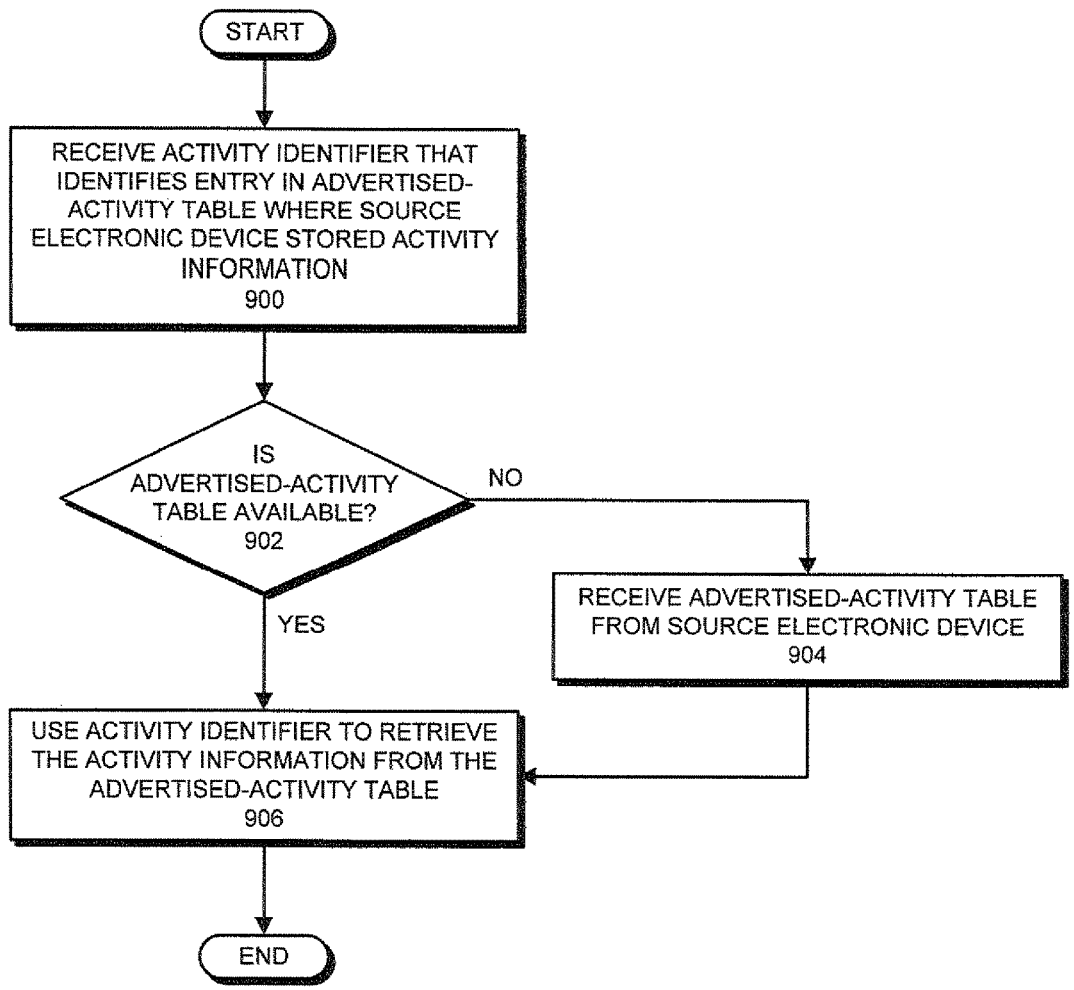
FIG. 9 presents a flowchart illustrating a process for determining whether the second application is available when the activity identifier identifies an entry in a structure that stores advertised activities in accordance with some embodiments.

Determining the Second Application Using a Structure Storing Advertised Activities As described earlier with reference to FIG. 3, in some embodiments, the activity identifier in the activity advertisement message identifies an entry in a structure (e.g., a table) in which the electronic device that advertised the activity stores activity information for the advertised activity. FIG. 9 presents a flowchart illustrating a process for determining whether the second application is available when the activity identifier identifies an entry in such a structure in accordance with some embodiments. More specifically, during the process shown in FIG. 9, companion electronic device 204 uses an activity identifier that identifies an entry in an advertised-activity table where source electronic device 202 stored activity information for the advertised activity to determine whether a second application that is associated with the first application is available at companion electronic device 204 (examples of advertised-activity tables are described in more detail below with reference to FIG. 12). Note that the operations shown in FIG. 9 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204), in some embodiments, other electronic devices and/or mechanisms perform the operations.

The process shown in FIG. 9 begins when companion electronic device 204 receives an activity identifier that identifies an entry in an advertised-activity table where source electronic device 202 stored activity information for the advertised activity (step 900). In some embodiments, the activity identifier includes a table identifier and an entry index, the table identifier identifying the advertised-activity table in which source electronic device 202 stored the activity information for the advertised activity, and the entry index identifying the entry in the advertised-activity table identified by the table identifier in which the activity information for the advertised activity is stored. In some embodiments, the table identifier is a hash of the advertised-activity table data.

Next, companion electronic device 204 determines whether the advertised-activity table for the activity identifier is available at companion electronic device 204 (step 902). In some embodiments, companion electronic device 204 uses the table identifier from the activity identifier to determine whether companion electronic device 204 has stored a local copy of the advertised-activity table.

If the advertised-activity table for the activity identifier is not available at companion electronic device 204 (step 902, no), companion electronic device 204 retrieves the advertised-activity table from source electronic device 202 (step 904). In some embodiments, companion electronic device 204 requests that source electronic device 202 send the advertised-activity table identified by the activity identifier from the activity advertisement message, e.g., the advertised-activity table identifier by the table identifier. Companion electronic device 204 can transmit such a request, and source electronic device 202 can respond to the request, using communication signals 208 and/or a different communication signals/a different channel.

In some embodiments, companion electronic device 204 periodically synchronizes its local copy/copies of advertised-activity tables with source electronic device 202. For example, companion electronic device 204 may receive a copy of an advertised-activity table from source electronic device 202 using a "push" mechanism, i.e., without sending a request for the copy of the advertised-activity table.

If the advertised-activity table for the activity identifier is available at companion electronic device 204 (step 902, yes), or after receiving the advertised-activity table from source electronic device 202, companion electronic device 204 uses the activity identifier to retrieve the activity information from the advertised-activity table (step 906). For example, companion electronic device 204 can retrieve the activity information from the entry in the advertised-activity table that is identified by the entry index.

In some embodiments, the operations shown in FIG. 9 enable information describing more than one activity to be advertised in a single activity advertisement message. For example, consider the case where the size of the activity advertisement message is limited, e.g., because of limitations of a network protocol used to broadcast the activity advertisement message. In this case, an entry identifier, i.e., an activity identifier that identifies an entry where activity information is stored, can be smaller (e.g., represented using fewer bits than the activity identifier) than an encoded representation, i.e., an activity identifier generated from the same activity information, enabling these embodiments to carry multiple entry identifiers in an activity advertisement message.

As described earlier with reference to FIG. 3, the described embodiments are not limited to using a table for storing the available activity information. Some embodiments use a different structure for storing the available activity information, such as an associative array, a content-addressable memory, etc. In these embodiments, the activity identifier can identify an entry in a structure in which source electronic device 202 stores activity information for the advertised activities. For example, in these embodiments, the table identifier can identify the structure and the entry index can identify the index in the structure where source electronic device 202 stored the activity information for the advertised activity.

Also, although we describe embodiments that use one advertised-activity table, some embodiments use more than one advertised-activity table, e.g., store activity information for advertised activities in different advertised-activity tables.

Determining a Most Recent Activity

Figure 10:
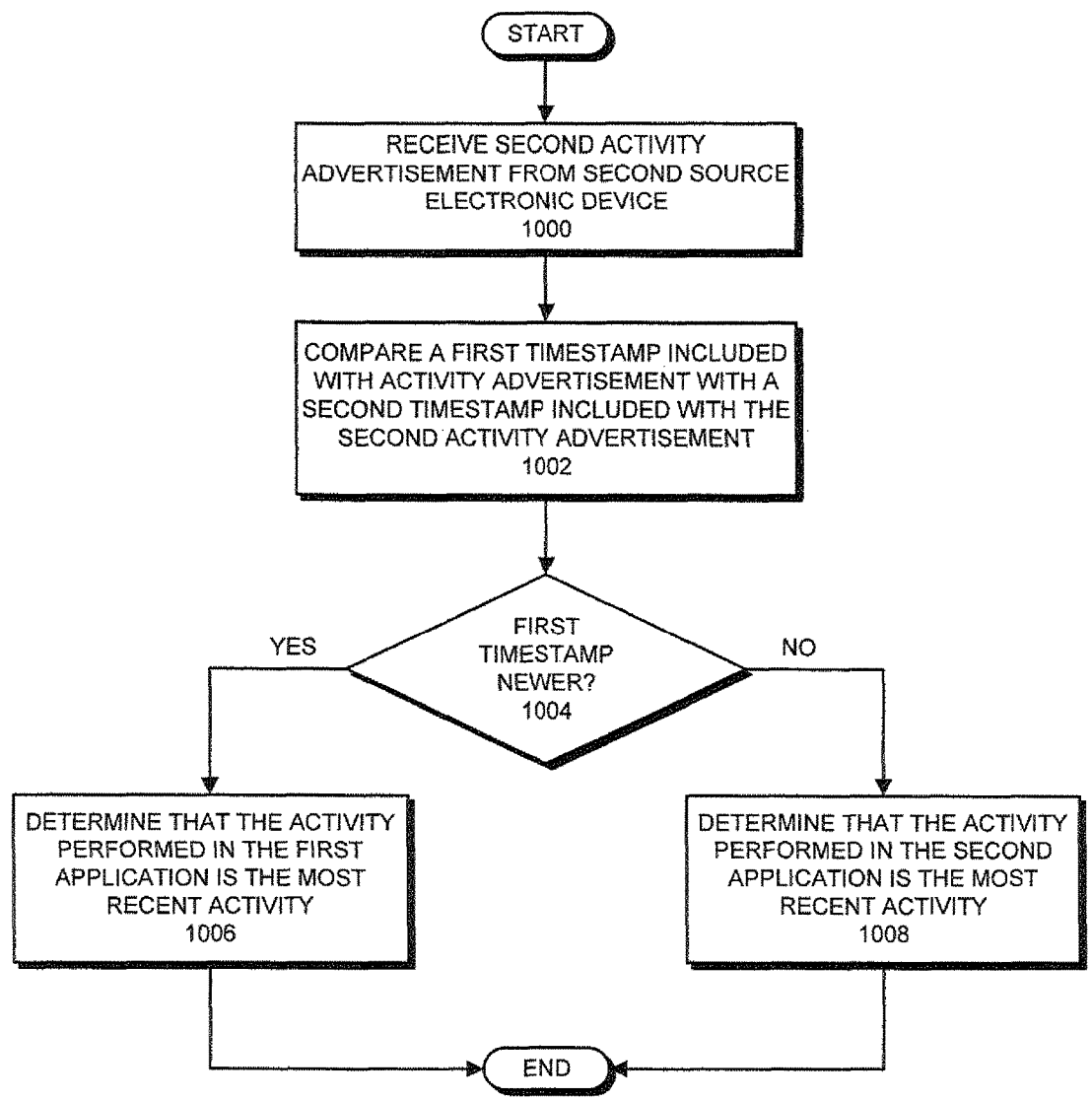
FIG. 10 presents a flowchart illustrating a process for determining a most recent activity from two or more activity advertisement messages in accordance with some embodiments.

As described earlier, network environment 200 can include a second source electronic device, which can broadcast activity advertisement messages for activities performed at the second source electronic device. As was also described earlier, some embodiments include a timestamp in an activity advertisement message to indicate the time that the activity advertised in the activity advertisement message was last performed. FIG. 10 presents a flowchart illustrating a process for determining a most recent activity from two or more activity advertisement messages in accordance with some embodiments. More specifically, during the process shown in FIG. 10, companion electronic device 204 uses a timestamp included with the advertisement from source electronic device 202 ("activity advertisement") and a timestamp included an advertisement from second source electronic device 206 ("second activity advertisement") to determine the most recent of the activities advertised in the activity advertisement and the second activity advertisement. Note that the operations shown in FIG. 10 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204, second source electronic device 206), in some embodiments, other electronic devices and/or mechanisms perform the operations.

For the process shown in FIG. 10, it is assumed that companion electronic device 204 has already received the activity advertisement from source electronic device 202, e.g., as shown in FIG. 5. Therefore, companion electronic device 204 has the activity advertisement, including a first timestamp included with the activity advertisement.

The process shown in FIG. 10 begins when companion electronic device 204 receives the second activity advertisement (step 1000). Next, companion electronic device 204 compares the first timestamp included with the activity advertisement with a second timestamp included with the second activity advertisement (step 1002). For example, companion electronic device 204 can compare the timestamps to see which one is newer (i.e., indicates a more recent time).

If the comparison indicates that the first timestamp is newer (step 1004, yes), companion electronic device determines that the activity performed in the first application, i.e., the activity advertised in the activity advertisement, is the most recent activity (step 1006). Otherwise, if the comparison indicates that the second timestamp is newer (step 1004, no), companion electronic device 204 determines that the activity performed in the second application, i.e., the activity advertised in the second activity advertisement, is the most recent activity (step 1008).

Figure 14:
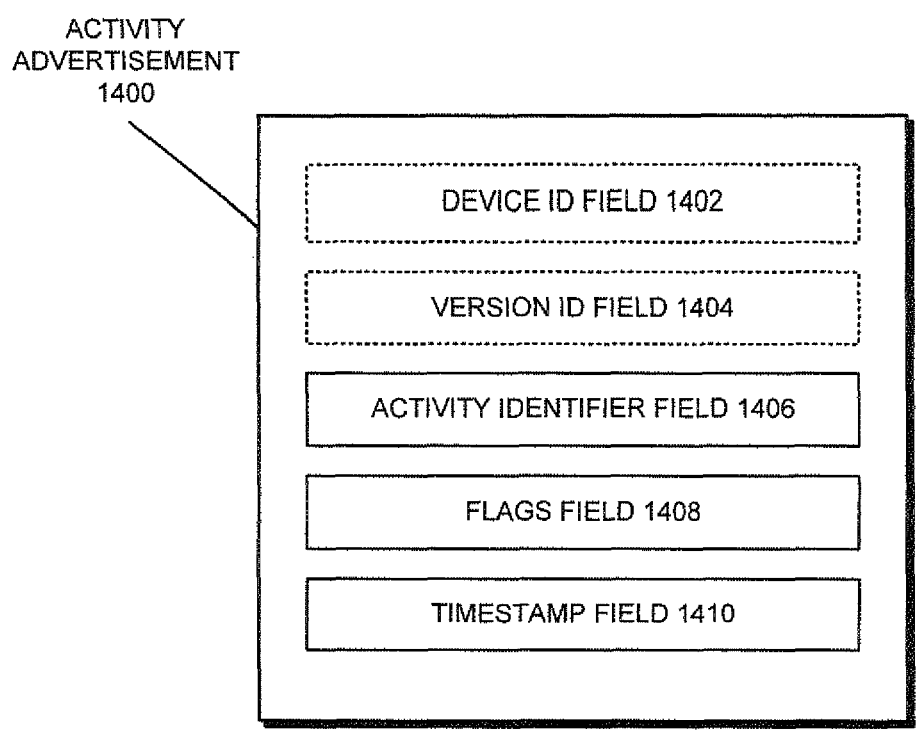
FIG. 14 presents a block diagram illustrating an activity advertisement message in accordance with some embodiments.

In some embodiments, companion electronic device 204 reduces the number of indications that are presented to a user in a display of companion electronic device 204 (e.g., as shown in FIG. 14) by only presenting an indication that an activity is resumable for the most recent of the advertised activities. In some embodiments, companion electronic device 204 uses timestamps to present the indications that activities are resumable in order, e.g., to present the most recent activity first, followed by other advertised activities in descending order based on relative recentness. In these embodiments, two or more indications can be presented side-by-side, one above the other, etc. in accordance with the relative recentness of the corresponding activities.

In some embodiments, companion electronic device 204 uses a history of activities that have previously been continued to present indications for activities that are resumable in order. In some embodiments, companion electronic device 204 ranks activities that have previously been continued higher in order, i.e., presents an indication that an activity that has previously been continued is resumable ahead of an indication that an activity that has not previously been continued is resumable. In some embodiments, two or more indications are presented in order based on a number of times that each of the corresponding activities have previously been continued.

Dynamic Type Information

As described earlier, some embodiments use activity information that describes an activity performed at an electronic device. In some embodiments, the activity information includes dynamic type information, which generally comprises data (e.g., a string) provided by the first application as it is executing. Dynamic type information can describe an attribute of an activity performed at the first application and can enable the first application to provide conditions under which the first application can be transferred to another electronic device. As will be described later with reference to FIG. 12, activity information that includes dynamic type information can be based on a dynamic-type descriptor, whereas other activity information can be based on an activity descriptor.

In some embodiments, activity descriptors differ from dynamic-type descriptor in that activity descriptors are static, whereas dynamic-type descriptors can be dynamically changed by an application at runtime. For example, source electronic device 202 can receive an activity descriptor when a first application is installed and can store activity information based on the activity descriptor persistently (e.g., at an available-activity table) so that it does not change unless the application is removed and/or re-installed. For example, when an e-mail application is installed, it can provide activity descriptors indicating that it can read and compose e-mail messages. As another example, when a media player application is installed it may provide activity descriptors to indicate it is able to play back media files.

In the same example, source electronic device 202 can receive the dynamic-type descriptor when the first application starts, or while the application is executing. For example, while an email application is executing, it may provide a dynamic-type descriptor that describes e-mail accounts that the application has access to. The email application mat provide new dynamic type information (or update existing information) as the user adds or removes email accounts from the application. As another example, a media player application may provide dynamic-type descriptors to specify the types of devices that the media can be played back on. In some embodiments, source electronic device 202 stores dynamic-type information based on the dynamic-type descriptor separately from activity information (e.g., in an available-dynamic-type table which is separate from the available-activity table). In some embodiments, dynamic type information stored in the available-dynamic-type table does not persist (is deleted) when an application exits. Generally, the first application can update activity information based on dynamic type descriptors as needed, whereas activity information based on activity descriptors remains unchanged at source electronic device 202 until the application is re-installed.

Some embodiments handle the dynamic type information similar to how activity information is handled. For example, source electronic device 202 can perform the process shown in FIG. 3 for dynamic type information (instead of activity information) in addition to (or instead of) performing it for activity information, thereby generating a dynamic type identifier using the same process used to generate an activity identifier (e.g., a hash function, which can be the same or different from the hash function used to generate the activity identifier). Similarly, the processes shown in FIGS. 4-6 and 8-10 can be performed for dynamic type information.

FIG. 18B presents an example of operations performed by source electronic device 202 and companion electronic device 204 when performing activity continuation using dynamic type information in accordance with some embodiments. To better illustrate differences between embodiments that use dynamic type information and those that do not, FIG. 18A is presented as an example of operations performed by source electronic device 202 and companion electronic device 204 when performing activity continuation without using dynamic type information in accordance with some embodiments. The operations shown in FIGS. 18A-B for source electronic device 202 can be performed during the process shown in FIG. 3, and the operations shown in FIGS. 18A-B for companion electronic device 204 can be performed during the process shown in FIG. 5. Note that the operations shown in FIGS. 18A-B are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204, etc.), in some embodiments, other mechanisms perform the operations. For example, second source electronic device 206 may perform similar operations to determine for itself whether a second application is available.

Considering first the example shown in FIG. 18A (which does not use dynamic type information), source electronic device 202 receives activity information A1 (step 1800), which includes an activity descriptor, e.g., the string "com.apple.Mail:Read." In this example, the activity information indicates that the application used to perform the activity is the Mail application, and the activity involves reading e-mail. Source electronic device 202 can receive the activity information A1 any time the Mail application is used. In some embodiments, source electronic device 202 receives activity information A1 when application Mail starts or is accessed. In some embodiments, source electronic device 202 receives activity information A1 when application Mail is installed and/or setup. In some embodiments, source electronic device 202 does not permit changes to activity information A1 after application Mail is installed until the application is re-installed, re-configured, and/or re-started.

Next, source electronic device 202 receives an identifier B1, which includes the string "00" (step 1802). Identifier B1 can include any data, e.g., can be an application identifier. In some embodiments, identifier B1 is a bundle identifier or team identifier that identifies the developer of application Mail. Note that step 1802 is optional—some embodiments do not use an identifier B1.

Then, source electronic device 202 generates an activity identifier, which is the output of a hash function HASH of A1 and B1 (step 1804), e.g., a hash of strings "com.apple.Mail:Read" and "00." Source electronic device 202 broadcasts an activity advertisement message that includes H1 (step 1806).

Looking now at companion electronic device 204, at some point in time (which can be a point in time before step 1800 is performed, while step 1800 is being performed, or after step 1800 is performed), similar to steps 1800-1802 for source electronic device 202, companion electronic device 204 receives activity information E1 (step 1810) and identifier F1 (step 1812) for an activity that can be performed using the Mail application at companion electronic device 204. Because the operations performed at companion electronic device 204 at steps 1810-1812 are similar to operations performed at source electronic device at steps 1800-1802, respectively, the description of these operations is not repeated here.

Next, companion electronic device 204 generates an available-activity identifier for the activity performed with application Mail (step 1814), which involves applying the same hash function used at step 1804 to E1 and F1. Companion electronic device 204 stores the activity identifier in an available-activity table (step 1816). Next, companion electronic device 204 receives the activity advertisement broadcast at step 1806 (step 1818). Then, companion electronic device 204 processes the received advertisement (step 1820), which can involve companion electronic device 204 performing operations similar to those shown in FIG. 5. In this example, companion electronic device will find a match for H1 (from the activity advertisement) in the entry in the available-activity table that stores H2, and may display an indication that the activity can be transferred.

Considering now the example shown in FIG. 18B (which uses dynamic type information), similar to steps 1800 and 1802 in FIG. 18A, at steps 1850 and 1854, respectively, source electronic device 202 receives activity information A1 and identifier B1. Because the operations performed at source electronic device 202 at steps 1850 and 1854 are similar to operations performed at source electronic device at steps 1800-1802, respectively, the description of these operations is not repeated here.

At some point in time, source electronic device 202 receives dynamic type information C1, e.g. a dynamic identifier, which includes the string "bob@apple.com" (step 1852). Application Mail can provide dynamic type information C1 at any point, including while the user is using the application, when the user makes a configuration change, e.g., when the user adds the email account "bob @ apple.com" to the Mail application, and/or each time a user opens an email message for that account.

Then, source electronic device 202 generates an activity identifier H3, i.e., a hash of A1, B1, and C1 (step 1856). Therefore, hash H3 includes dynamic type information that describes an activity being performed in an application, e.g., Mail, at source electronic device 202. Next, source electronic device 202 broadcasts an activity advertisement with that includes H3 (step 1858). Because the activity advertisement includes H3, which is derived based on dynamic type information, the activity advertisement message comprises dynamic type information describing an attribute of an activity being performed in the Mail application at the source electronic device 202.

Looking now at companion electronic device 204, at steps 1860 and 1864, companion electronic device 204 performs operations similar to those for steps 1810-1812 (see FIG. 18A), respectively. Because the operations performed at companion electronic device 204 at steps 1860 and 1864 are similar to operations performed at steps 1810-1812, respectively, the description of these operations is not repeated here.

At some point in time, companion electronic device 204 receives dynamic type information G1 and G2 (step 1862), which include strings "bob@apple.com" and "bob@me.com," e.g., two separate e-mail addresses that application Mail can access at companion electronic device 204. Companion electronic device 204 can receive G1 and G2 at the same time or separately. For example, application Mail can provide G1 and/or G2 to companion electronic device 204 when a user adds each account to a list of accounts that Mail can access, or each time a user accesses an account to read and/or compose an email message, or a third party such as an account provider can communicate this information to companion electronic device 204.

Next, companion electronic device 204 generates two activity identifier, which includes hashes H4=HASH(E1, F1, G2) and H5=HASH(E1, F1, G2) (step 1866). Companion electronic device 204 stores H4 and H5 in an available-dynamic-type table (step 1868), indicating that application Mail can continue activities for those dynamic types.

Next, companion electronic device 204 receives the activity advertisement broadcast at step 1858 (step 1870). Then, companion electronic device 204 processes the received activity advertisement (step 1872), which can involve, which can involve companion electronic device 204 performing operations similar to those shown in FIG. 11. In this example, companion electronic device 204 will find a match for H3 (from the activity advertisement) in the entry in the available-dynamic-type table that stores H4, and may display an indication that the activity can be transferred. In some embodiments, however, if companion electronic device 204 does not find a match for the hash, companion electronic device 204 does not display the indication that activity can be transferred.

Note that some embodiments perform operations for broadcasting activity advertisements both without and with dynamic type information. For example, in some embodiments source electronic device 202 performs some or all of operations 1800-1806 and 1850-1858. Some of these embodiments broadcast both types of activity advertisements to ensure backwards compatibility embodiments that do not use dynamic-type-information.

Determining Second Application Using Dynamic Type Information

As described earlier, in some embodiments, an electronic device determines whether a second application that is associated with a first application is available in the electronic device (to facilitate a possible transfer of an activity to the electronic device). FIG. 11 presents a flowchart illustrating a process for determining whether a second application is available at companion electronic device 204 when the above-described dynamic type information is used in accordance with some embodiments. The operations shown in FIG. 11 can be performed during the process shown in FIG. 5, e.g., at step 504. Note that the operations shown in FIG. 11 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations to determine for themselves whether a second application is available.

Figure 11:
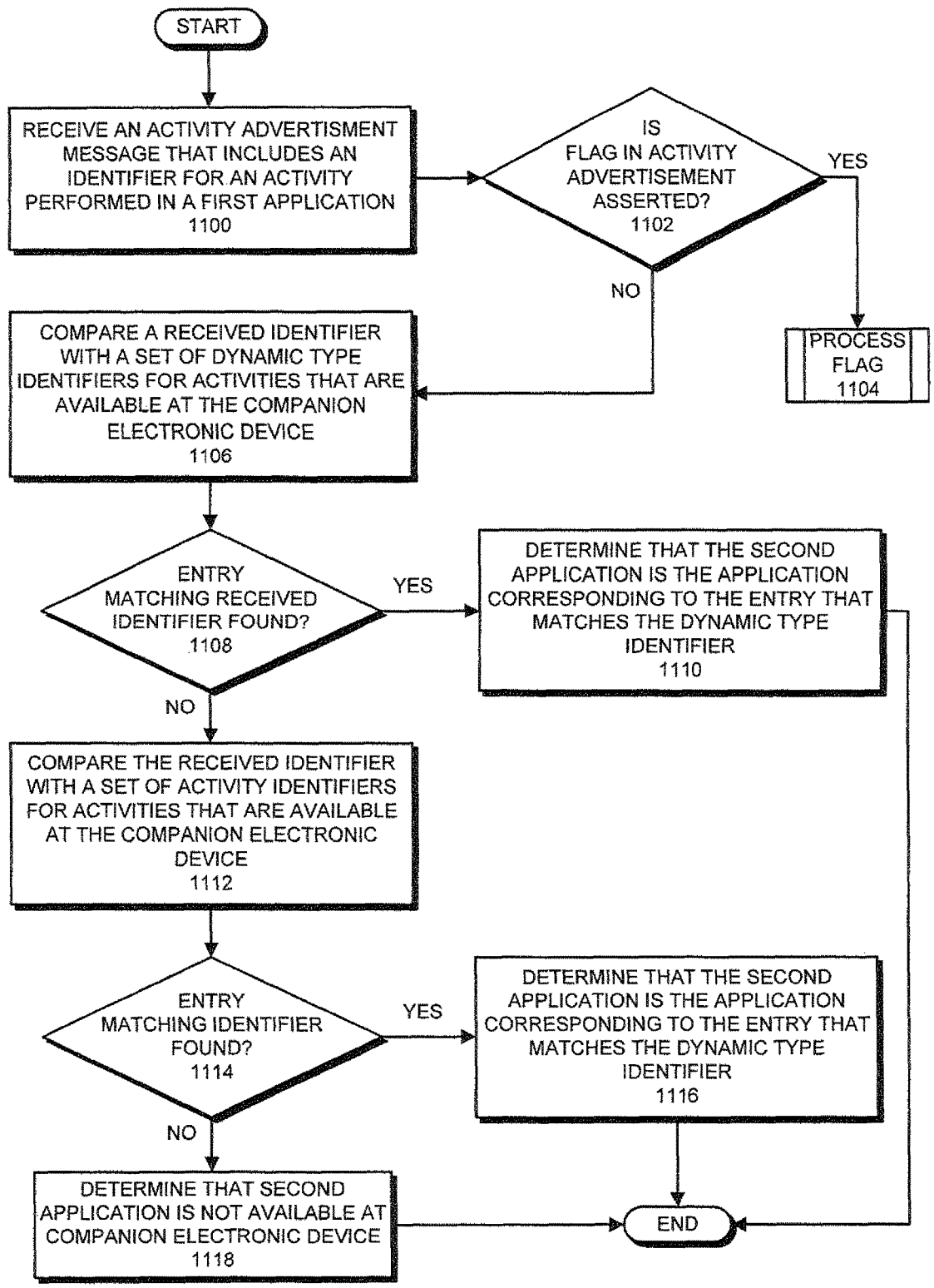
FIG. 11 presents a flowchart illustrating a process for determining whether a second application is available at companion electronic device 204 when dynamic type information is used in accordance with some embodiments.
Figure 12:
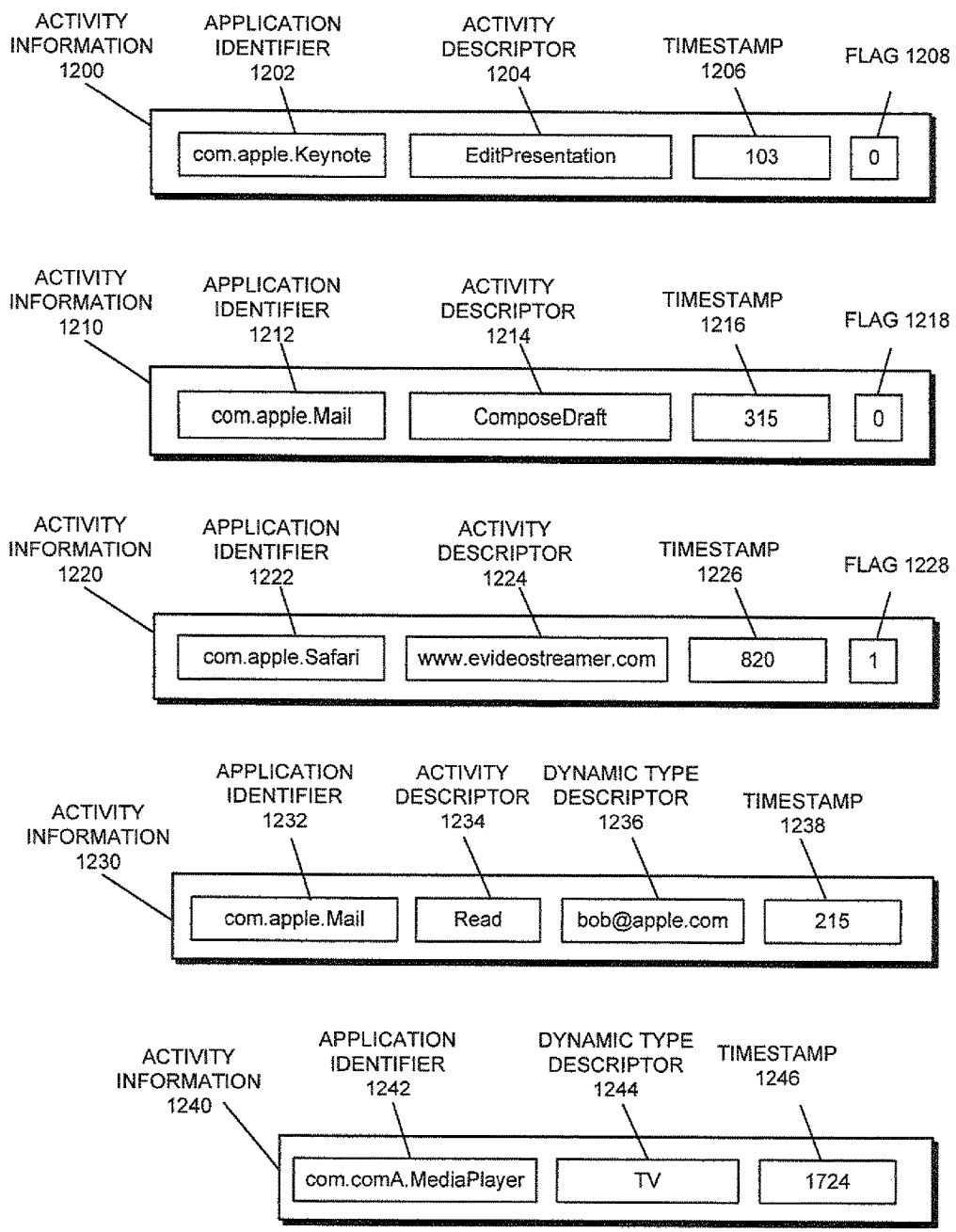
FIG. 12 presents a block diagram illustrating activity information in accordance with some embodiments.

The process shown in FIG. 11 begins when companion electronic device 204 receives an activity advertisement message that includes an identifier for an activity performed in a first application, e.g., a first application executing at source electronic device 202 (step 1100). The received identifier can include/be generated from an activity descriptor and/or a dynamic type identifier, examples of which as shown in FIG. 12.

If the flag in the activity advertisement message is asserted (step 1102, yes), companion electronic device 204 processes the flag (step 1104). The processing of the flag which takes place at step 1104 was described earlier with reference to FIG. 8. Some embodiments repeat step 1104 (i.e., the processing described with reference to FIG. 8) for each asserted flag in the activity advertisement message, e.g., repeat the processing for each asserted flag when the activity advertisement message comprises two or more asserted flags.

If the activity advertisement messages do not comprise an asserted flag (step 1102, no), companion electronic device 204 compares the received identifier with a set of dynamic type identifiers for activities that are available at companion electronic device 204 (step 1106). For example, companion electronic device 204 can look up the received identifier in the available-dynamic-type table at companion electronic device 204 (or other structure where companion electronic device 204 stores available dynamic type information).

If the lookup for the received identifier finds a match in an entry in the available-dynamic-type table (step 1108, yes), companion electronic device 204 determines that the second application is the application whose dynamic type identifier is stored in that entry (step 1110).

If the lookup for the received identifier does not find a match in the available-dynamic-type table (step 1108, no), companion electronic device 204 compares the received identifier with a set of activity identifiers for activities that are available at companion electronic device 204 (step 1112). For example, companion electronic device 204 can look up the received identifier in the available-activity table at companion electronic device 204 (or other structure where companion electronic device 204 stores available dynamic type information).

If the lookup for the received identifier finds a match in an entry in the available-activity table (step 1114, yes), companion electronic device 204 determines that the second application is the application whose activity identifier is stored in that entry (step 1116).

If the lookup for the received identifier does not find a match in the available-activity table (step 1114, no), companion electronic device 204 determines that an application associated with the first application (e.g., an application that can continue the activity performed with the first application) is not available at companion electronic device 204 (step 1118).

Activity Information

As described earlier, some embodiments use activity information that describes an activity performed at an electronic device. FIG. 12 presents a block diagram illustrating activity information 1100-1140 in accordance with some embodiments. Note that activity information 1100-1140 shown in FIG. 12 are presented as a general example of formats of activity information used by some embodiments. Some embodiments use a different format and/or include different information in activity information.

Activity information 1200 includes application identifier 1202, which identifies the application used to perform the activity described in activity information 1200. For example, application identifier 1202, which includes the string com.apple.Keynote, identifies application Keynote, an application that can be used to edit and view presentations. Activity descriptor 1204 includes the string EditPresentation, which identifies the activity performed with application Keynote as editing a presentation. Timestamp 1206, which includes the string/number 103, identifies a time that the activity was last performed, for example, the last time that a user edited the presentation in application Keynote. The timestamp can indicate a real time, e.g., the wall-clock time (or a representation thereof, such as a system time) when the activity was last performed, or it can be a representation of time elapsed since the activity was last performed after the top of the hour, or since a synchronization event. In some embodiments, the timestamp indicates a real time, e.g., the absolute/wall-clock time (or a representation thereof, such as a system time) when source electronic device 202 was last used (e.g., last used actively by a user), or it can be a representation of time elapsed since source electronic device 202 was last used after the top of the hour, or since a synchronization event. In activity information 1200, flag 1208 is not asserted.

Activity information 1210 includes application identifier 1212, which identifies the application used to perform the activity described in activity information 1210. For example, application identifier 1212, which includes the string com.apple.Mail, identifies application Mail, an application that can be used to compose and send e-mail messages. Activity descriptor 1214 includes the string ComposeDraft to identify that the activity performed with application Mail includes composing a message draft. Timestamp 1216, which includes string/number 315, identifies a time that the activity was last performed, for example, the last time that the user used Mail to compose the draft. Flag 1218 for activity information 1210 is not asserted.

Activity information 1220 includes application identifier 1222, which identifies the application used to perform the activity described in activity information 1220. For example, application identifier 1222, which includes the string com.apple.Safari, identifies application Safari, a web browser. Activity descriptor 1224 includes the string www-.evideostreamer.com, which identifies a domain name accessed with the web browser. In this example, activity descriptor 1224 holds a domain name, so flag 1228 in activity information 1220 is asserted flag 1228 to indicate that activity description 1224 comprises a domain name. Timestamp 1226, which includes string/number 820, identifies a time that the web browser was last used to access the move-streaming website.

Activity information 1230 includes application identifier 1232, which identifies the application used to perform the activity described in activity information 1230. For example, application identifier 1232, which includes the string com- .CompanyA.MediaPlayer, identifies application Media- Player (which in this example is developed by developer CompanyA), an application that can be used to play and record multimedia content. Activity descriptor 1234 includes the string PlayVideo to identify that the activity performed with application MediaPlayer includes playing a video, i.e., video playback. Timestamp 1236, which includes string/number 902, identifies a time that the activity was last performed, for example, the last time that the user used MediaPlayer to play the video. Flag 1238 for activity information 1230 is not asserted.

Activity information 1230 includes application identifier 1232, which identifies application Mail, and activity descriptor 1234, which describes that the activity involves reading mail. Dynamic type descriptor 1236 describes an attribute of the activity, i.e., an email account from which mail can be read. In this example, application Mail can use the dynamic type descriptor 1236 to indicate e-mail accounts to which it has access. Timestamp 1238 identifies a time that mail was last read.

Activity information 1240 includes application identifier 1242, which identifies MediaPlayer as the application which is used to perform the activity. Dynamic type descriptor 1244, which includes the string TV, is used to indicate that the activity can be continued on a television. Timestamp 1238 identifies a time that MediaPlayer was last used.

For illustrative purposes, the timestamps shown in FIG. 11 are calculated as a delta (difference) from a synchronization event, e.g., the top of the hour. Hence, in the examples shown in FIG. 11, the activity described with activity information 1200 is the most recent activity, because timestamp 1206 indicates that the least amount of time has elapsed from the top of the hour since the activity described with activity information 1200 was performed.

Note that, although the examples shown in FIG. 12 use strings for the application identifier, the activity descriptor, and the dynamic type descriptor, some embodiments may use different information to identify the application and/or the activity. For example, some embodiments use a numerical identifier for the application identifier and/or the activity descriptor. In some embodiments, the application identifier is an identifier for the corresponding application in an online "app store." In some embodiments, the application identifier comprises some or all of a bundle identifier, e.g., a bundle ID. Also, although the application identifier shown is separate from the activity descriptor, some embodiments combine the application identifier and the activity descriptor in a single identifier.

In some embodiments, application/app developers provide the information for the activity and/or dynamic type descriptors, such as activity descriptor 1204, 1214, 1224, and 1234, and/or dynamic type descriptors 1236 and/or 1234. In these embodiments, the developer of an application/app may determine a number of activities for the application/app and may provide relevant values for activity and/or dynamic descriptors.

Advertised-Activity Table

Figure 13:
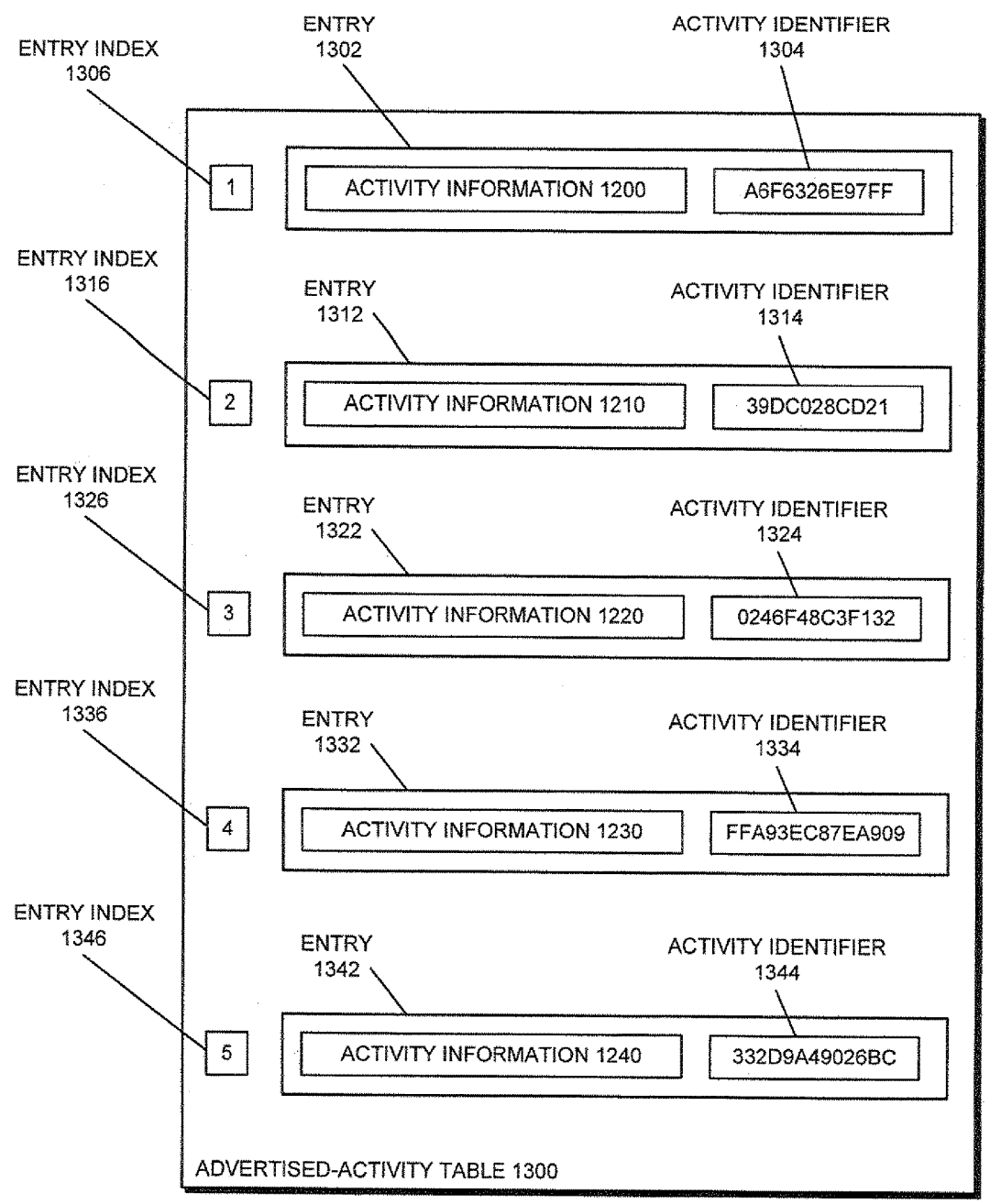
FIG. 13 presents a block diagram illustrating an advertised-activity table in accordance with some embodiments.

FIG. 13 presents a block diagram illustrating an advertised-activity table 1300 in accordance with some embodiments. As described above, advertised-activity table 1300 includes information about activities that have been advertised (i.e., activities for which an activity advertisement message has been sent by an electronic device such as source electronic device 202). Note that the advertised-activity table shown in FIG. 13 is presented as a general example of advertised-activity tables used by some embodiments. Some embodiments represent activity information differently and/or include more or less information in the advertised-activity table.

Entry 1302, which is identified by entry index 1306, stores activity information 1300 and activity identifier 1304. In this example, activity identifier 1304 is generated using application identifier 1202 and activity descriptor 1204, such as a hash of string "com.apple.Keynote::EditPresentation."

Entry 1312, which is identified by entry index 1316, stores activity information 1210 and activity identifier 1314. In this example, activity identifier 1314 is generated using application identifier 1212 and activity descriptor 1214, such as a hash of string "com.apple.Mail::ComposeDraft."

Entry 1322, which is identified by entry index 1326, stores activity information 1220 and activity identifier 1324. In this example, activity identifier 1324 is generated using activity descriptor 1224, such as a hash of string www.evideostreamer.com.

Entry 1332, which is identified by entry index 1336, stores activity information 1230 and activity identifier 1334. In this example, activity identifier 1334 is generated using application identifier 1202, activity descriptor 1234, and dynamic type descriptor 1236, such as a hash of the string "com.apple.Mail:Read:bob@apple.com." Note that, because activity identifier 1334 includes dynamic type information, activity identifier 1334 can also be referred to a dynamic type identifier (i.e., the terms can be used interchangeably when the activity information includes dynamic type information).

Entry 1342, which is identified by entry index 1346, stores activity information 1240 and activity identifier 1344. In this example, activity/dynamic type identifier 1344 is generated using application identifier 1242 and dynamic type descriptor 1244, such as a hash of the string "com.comA.MediaPlayer:TV." The first application can use the dynamic type information string "TV" to indicate that the activity can be continued on a television set.

For illustrative purposes, entries 1302-1342 store all of activity information 1200-1430, respectively. Note though that, in some embodiments, entries 1302-1342 store only some of activity information 1200-1240, respectively. For example, some embodiments do not store timestamps 1206-1246 in entries 1302-1342.

Available-Activity Table

In some embodiments, the above-described available-activity table is formatted similarly to advertised-activity table 1300 shown in FIG. 13. However, the entries in the available-activity table include application information for applications that are available in the corresponding electronic device, e.g., companion electronic device 204.

Available-Dynamic-Type Table

In some embodiments, the above-described available-dynamic-type table is formatted similarly to advertised-activity table 1300 shown in FIG. 13. However, the entries in the available-dynamic-type table include dynamic type information for applications that are available in the corresponding electronic device, e.g., companion electronic device 204.

In some embodiments, the available-activity table and available-dynamic-type table are combined at companion electronic device 204 to a single table/structure.

Activity Advertisement Message

FIG. 14 presents a block diagram illustrating an activity advertisement 1400, e.g., an activity advertisement message, in accordance with some embodiments. Note that the activity advertisement message shown in FIG. 14 is presented as a general example of an activity advertisement message used by some embodiments. Some embodiments order fields in the activity advertisement message differently and/or include different information in the activity advertisement message.

Activity advertisement message 1400 optionally includes device ID field 1402 and version ID field 1404. Device ID field 1402 includes an identifier that identifies the device from which activity advertisement message 1400 was sent, e.g. identifies source electronic device 202. Version ID field 1404 includes a version identifier, such as a version identifier that companion electronic device 204 can use to determine how fields in activity information 1400 are formatted and/or how information is stored in the fields.

Activity identifier field 1406 includes an activity identifier, e.g., one or more of activity identifiers 1304-1344. Flags field 1408 includes one or more flags corresponding to the advertised activity, e.g., flag 1208-1228.

Timestamp field 1410 includes a timestamp for an activity advertised in activity identifier field 1406, e.g., one or more of timestamps 1206-1226.

Resumable-Activity Indication

Figure 15:
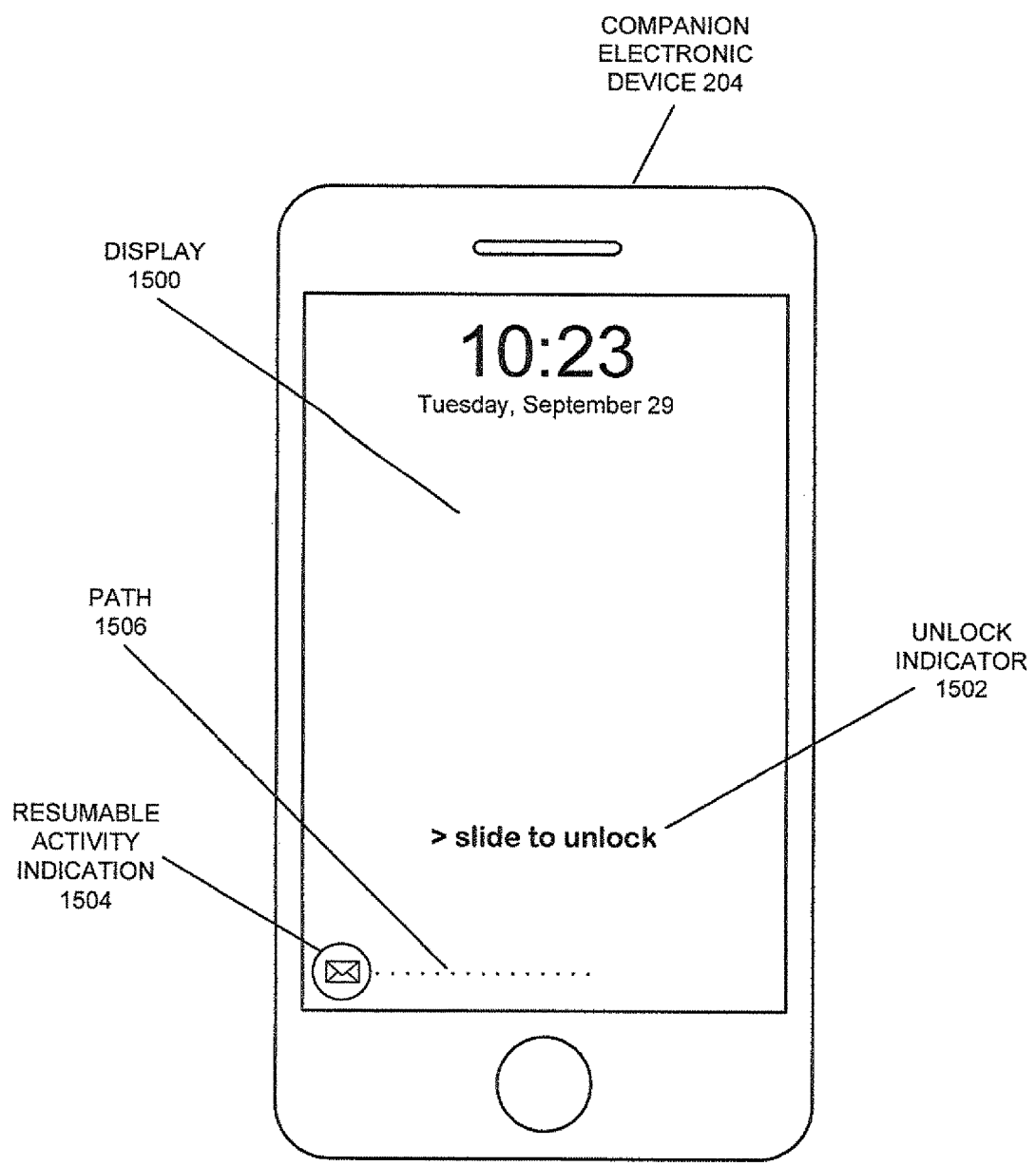
FIG. 15 presents a block diagram illustrating a resumable-activity indication in accordance with some embodiments.

As described earlier, some embodiments present an indication that the activity is resumable before requesting the extended activity data. FIG. 15 presents a block diagram illustrating a resumable-activity indication, i.e., an indication that an activity is resumable, in accordance with some embodiments. More specifically, FIG. 15 shows a resumable-activity indication displayed on display 1500 for companion electronic device 204. Note that the resumable-activity indication shown in FIG. 15 is presented as a general example of a resumable-activity indication used by some embodiments. Some embodiments use a different resumable-activity indication and/or present the resumable-activity indication differently.

In the illustrated embodiment, companion electronic device 204 is a smartphone that comprises a touch-screen display 1500. The embodiment shown in FIG. 15 is in a receptive state because display 1500 shows a lock screen with unlock indicator 1502, which shows the phrase "slide to unlock." Generally, a user of companion electronic device 204 performs an operation with unlock indicator 1502 to unlock companion electronic device 204, such as sliding a graphic for unlock indicator 1502 across display 1500 with a finger.

Resumable-activity indication 1504 comprises a graphic, e.g., an icon, that a user can manipulate to accept (or reject) the activity transfer. In FIG. 15, resumable-activity indication 1504 comprises an icon resembling an envelope, indicating that the resumable activity includes using a mail application. In some embodiments the user can accept the activity transfer by clicking on/touching resumable-activity indication 1504, and/or by moving resumable-activity indication 1504 along one or more paths on display 1500. For example, in some embodiments the user can accept the activity transfer by touching and dragging resumable-activity indication 1504 along or near path 1506 (shown as a dotted line).

For illustrative purposes, resumable-activity indication 1504 is shown at a lock screen for companion electronic device 204. In some embodiments, resumable-activity indication 1504 can be shown at a different screen/location, e.g., at an unlocked screen, at a menu bar, by using a notification window/pop-up, etc. Also, the position, size, graphic, color and/or other visual features of resumable-activity indication 1504 can vary for different embodiments, and can depend on the type of activity that can be resumed. For example, in some embodiments companion electronic device 204 determines the graphic shown in resumable activity indication 1504 based on the application identifier for the advertised activity. As another example, in some embodiments resumable-activity indication 1504 is shown at the lower left corner of display 1500. Some embodiments present multiple resumable-activity indicators at the same time.

Note that accepting (or rejecting) the activity transfer can include moving resumable-activity indication 1504 along a different path than path 1506, e.g., to the top of the screen, along a curved path, etc. In some embodiments, the user can accept the activity transfer by performing one or more of: clicking on resumable-activity indication 1504, tapping on resumable-activity indication 1504, swiping resumable-activity indication 1504, or performing a gesture using resumable-activity indication 1504.

Applications of Dynamic Type Information

As described earlier, some embodiments use dynamic type information to enable the first application to provide conditions under which the first application can be transferred to another electronic device. Examples of dynamic type information (e.g., information that, for the purposes of this description, is treated/processed like activity information was described above with reference to FIGS. 12-13). An application can use dynamic type information to control when an activity can be transferred to another device, which can prevent presenting a resumable activity indication for an activity.

For example, consider the case where a user uses the iTunes media player to play a song that was purchased using a first account (iTunes is a trademark of Apple Inc. of Cupertino, Calif.). iTunes can provide a dynamic type descriptor to indicate that the activity of playing the song can be continued only on devices that have access to that account. For example, with reference to FIG. 12, iTunes can provide dynamic descriptor 1236 to cause an advertisement that includes the dynamic type information in dynamic descriptor 1236 to be broadcast. In this example, only companion electronic devices that have access to that account (i.e., that have created an activity identifier that matches the one broadcast for iTunes) can continue the activity.

As another example, consider an application that allows activities involving phone calls or text messages to be continued on a computer. The phone's user may want these activities to be continued on a personal laptop, but not on a shared desktop computer. In this example, a first application (e.g., an application that is used to make phone calls and/or send/receive text messages) can provide dynamic type descriptors that identify the devices owned by the user to which the activities continued, thereby preventing other devices from displaying a resumable activity indicator for an activity they can otherwise continue.

As another example, consider activity information 1240 in FIG. 12. In this example, an application can provide dynamic type descriptor 1244 to indicate that the activity performed in the application can be continued only on certain types of devices. For example, the user may be using a device to watch a movie but does not want resumable activity indicators for watching movies shown to a phone or watch. By providing a dynamic descriptor identifying the types of devices that an activity can be continued on (e.g., a tablet or a television (TV)), other devices will not unnecessarily display a resumable activity indicator.

Hence, by using dynamic type information, embodiments of the present invention can prevent resumable activity indicators from being displayed on devices where an activity cannot (or is not desired to be) continued).

Automatic and Manual Activity Advertisement

In some embodiments, source electronic device 202 broadcasts activity advertisements automatically, e.g., at predetermined time intervals, as soon as activity information is received, based on a detected location of source electronic device 202, etc. In these embodiments, source electronic device 202 can provide a setting, e.g., a system preference, which a user can use to turn the broadcasting of activity advertisements on or off.

In some embodiments, source electronic device 202 starts broadcasting activity advertisements manually, i.e., waits for input from a user to begin broadcasting the activity advertisements. In some of these embodiments, source electronic device 202 starts broadcasting activity advertisements upon detecting the user's input, and continues to broadcast activity advertisements for a predetermined period of time and/or until the user provides an input directing source electronic device 202 to stop the activity advertisements. In some embodiments, the user input for starting and/or stopping activity advertisements includes motion of source electronic device 202 (e.g., shaking source electronic device 202, moving source electronic device 202 in an arc, rocking source electronic device 202, etc.), performing one or more gestures on a touch screen for source electronic device 202, pressing a key and/or button combination, etc.

In some embodiments, the activity advertisement message and/or a message that source electronic device 202 sends to companion electronic device 204 along with (i.e., in addition to) the activity advertisement message causes companion electronic device 204 to start a timer. In some embodiments, companion electronic device 204 remains in the receptive state as described above until this timer expires. Source electronic device 202 can provide an expiry time for the timer to companion electronic device 204, or companion electronic device 204 can determine the expiry time.

In some embodiments, companion electronic device 204 presents an indication that the activity is resumable until the timer expires, and, if the user accepts the indication, continues the activity at companion electronic device 204 without the user performing one or more operations (e.g., fingerprint scan, password entry, etc.) to unlock companion electronic device 204. More specifically, companion electronic device 204 can detect that the user accepted the indication and can bypass the lock screen/unlock operation, allowing the user to start using companion electronic device 204 without unlocking companion electronic device 204. In some embodiments, the user is allowed to bypass the lock screen/unlock operation only before the timer expires.

Activity Continuation Framework

In some embodiments, a third-party application receives access to some or all of the activity transfer operations, e.g., operations described earlier with reference to FIGS. 3-10, through an "activity continuation" framework that is available at electronic devices that can participate in activity transfer operations. The activity continuation framework can provide the third-party application access to an operating system function, a daemon, a process, a service, etc., that performs at least some of the activity transfer operations. For example, in some embodiments, the provider of an electronic device and/or operating system for the electronic device provides an application programming interface (API) through which third-party applications can make calls to functions that facilitate activity transfer operations. In some embodiments, the activity continuation framework enables third-party applications (and third-party application developers) to transfer an activity from one electronic device to another electronic device without implementing (or even having knowledge of) the low-level details of activity continuation.

For example, in some embodiments, to enable the third-party application to participate in activity transfer operations, the third-party application developer provides activity descriptors for activities that the third-party application can perform and a method for the third-party application to be configured to perform an activity. In some of these embodiments, at an electronic device such as source electronic device 202, the third-party application makes a call to a function provided by the activity continuation framework to provide an activity descriptor (and possibly extended activity data) for an activity performed in the third-party application. At an electronic device such as companion electronic device 204, to configure the third-party application to perform the activity, the activity continuation framework can pass the extended activity data to the third-party application (e.g., through a command line switch or parameter, by using an object, etc.). Hence, the activity continuation framework can facilitate activity continuation for third-party applications with minimal effort and expense for the third-party application developer.

Messages Exchanged Between Electronic Devices

Figure 16:
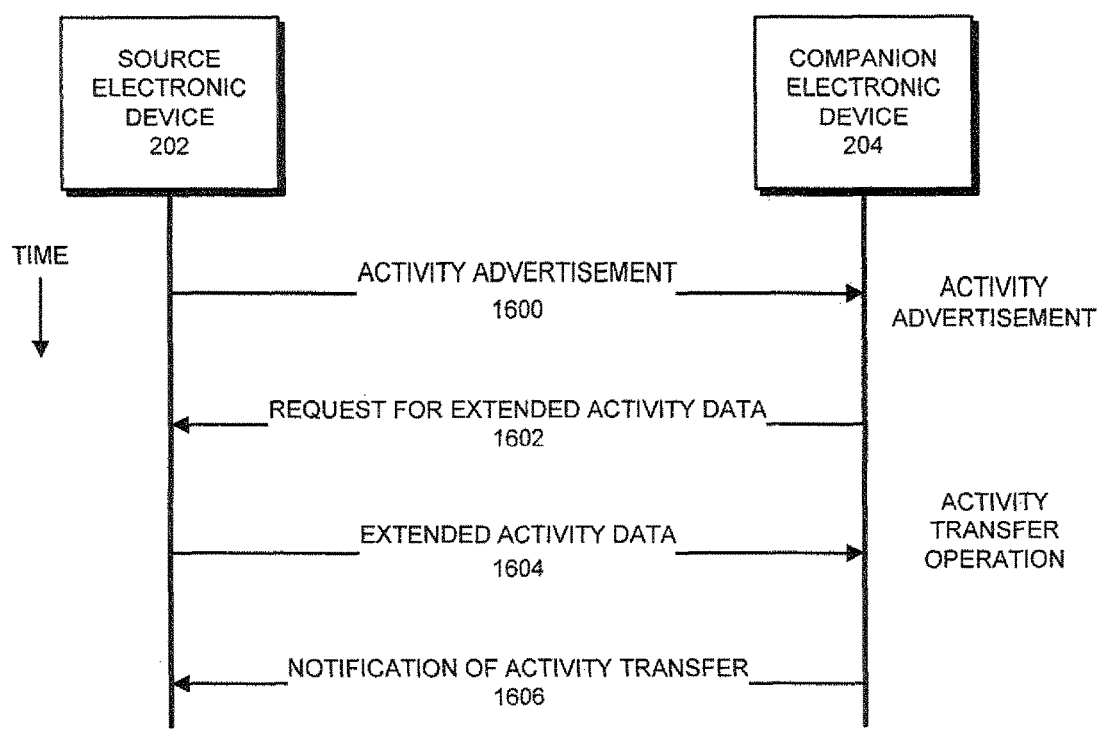
FIG. 16 presents a swim lane diagram illustrating messages exchanged between electronic devices in accordance with some embodiments.

FIG. 16 presents a swim lane diagram illustrating messages exchanged between electronic devices in accordance with some embodiments. As can be seen in FIG. 16, the messages are exchanged between source electronic device 202 and companion electronic device 204 over a period of time, with activity advertisement 1600 occurring first in time and the lower messages occurring subsequently in time. Although FIG. 16 is shown with messages exchanged in a particular order, in some embodiments, other messages are exchanged and/or messages are exchanged in a different order. Generally, electronic devices in the described embodiments exchange sufficient messages to enable the operations herein described.

The messages in FIG. 16 are associated with two operations performed by source electronic device 202 and/or companion electronic device 204. The first operation, which includes advertisement 1600, is an activity advertisement operation such as is shown in FIG. 3. During the activity advertisement operation, source electronic device 202 broadcasts at least one activity advertisement 1600.

The second operation, which includes request for extended activity data 1602, extended activity data 1604, and notification of activity transfer 1606, is an activity transfer operation such as shown in FIGS. 5-6. During the activity transfer operation, companion electronic device 204 responds to activity advertisement 1600 with request for extended activity data 1602. Upon receiving the request for extended activity data 1602, source electronic device 202 responds by sending extended activity data 1604. In some embodiments, after companion electronic device 204 uses the extended activity data to commence performing the activity at the second application, companion electronic device 204 sends notification of activity transfer 1606 to let source electronic device 202 know that the activity was transferred.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method, comprising:
    in a companion electronic device, performing operations for:
    receiving an activity advertisement message from a source electronic device, the activity advertisement message comprising dynamic type information describing an attribute of an activity;
    evaluating the dynamic type information to determine whether the companion electronic device includes an application configured to perform a corresponding activity by:
        comparing a dynamic type identifier for the activity with a set of dynamic type identifiers for activities that are available at the companion electronic device; and
        in response to determining that the dynamic type identifier is not in the set of dynamic type identifiers, comparing the dynamic type identifier to a set of activity identifiers for activities that are available at the companion electronic device;
    in response to determining that the companion electronic device includes the application configured to perform the corresponding activity, requesting extended activity data for the activity from the source electronic device;
    using the extended activity data received from the source electronic device to configure the application configured to perform the corresponding activity on the companion electronic device to perform the corresponding activity; and
    performing the corresponding activity using the application configured to perform the corresponding activity on the companion electronic device.

2. The method of claim 1,
    wherein the dynamic type identifier for the activity comprises an identifier for a first application performed on the source electronic device and a descriptor for a dynamic type; and
    wherein each dynamic type identifier from the set of dynamic type identifiers comprises an identifier for a corresponding application that is available on the companion electronic device and a descriptor for a corresponding dynamic type in a set of dynamic types for the corresponding application.

3. The method of claim 2,
    wherein each activity identifier in the set of activity identifiers is added to the set of activity identifiers when an application corresponding to the activity identifier is installed on the companion electronic device.

4. The method of claim 3, wherein the first application provides the dynamic type information during runtime.

5. The method of claim 1, further comprising:
    in the companion electronic device, performing operations for:
    receiving a table of activities recently performed at the source electronic device; and
    using an index that identifies an entry in the table of activities to determine the dynamic type identifier for the activity, wherein the dynamic type information comprises the index.

6. The method of claim 1, wherein the advertisement message comprises a hash of a character string, the character string comprising the dynamic type information and an identifier that identifies a first application that performs the activity on the source electronic device.

7. The method of claim 1, further comprising:
in the companion electronic device, performing operations for:
receiving a second activity advertisement message from a second source electronic device, the second activity advertisement message comprising dynamic type information describing an attribute of an activity performed on the second source electronic device; and
based on comparing a first timestamp included with the activity advertisement message and a second timestamp included with the second activity advertisement message, determining that the activity performed in a first application on the source electronic device is a most recent activity of the activity performed on the source electronic device and the activity performed on the second source electronic device.

8. The method of claim 1, further comprising:
in the companion electronic device, performing operations for:
prior to requesting the extended activity data, presenting an indication that the activity is resumable, the indication presented on the companion electronic device; and
upon receiving an acceptance of the indication, performing the using the extended activity data and the performing the corresponding activity.

9. The method of claim 1, wherein the activity advertisement and the extended activity data are communicated using a Bluetooth low-energy (BLE) network protocol.

10. A companion electronic device comprising:
a processing subsystem; and,
a networking subsystem;
wherein the processing subsystem and the networking subsystem are configured to perform operations for:
receiving an activity advertisement message from a source electronic device, the activity advertisement message comprising dynamic type information describing an attribute of an activity;
evaluating the dynamic type information to determine whether the companion electronic device includes an application configured to perform a corresponding activity by:
comparing a dynamic type identifier for the activity with a set of dynamic type identifiers for activities that are available at the companion electronic device; and
in response to determining that the dynamic type identifier is not in the set of dynamic type identifiers, comparing the dynamic type identifier to a set of activity identifiers for activities that are available at the companion electronic device;
in response to determining that the companion electronic device includes the application configured to perform the corresponding activity, requesting extended activity data for the activity from the source electronic device;
using the extended activity data received from the source electronic device to configure the application configured to perform the corresponding activity on the companion electronic device to perform the corresponding activity; and
performing the corresponding activity using the application configured to perform the corresponding activity on the companion electronic device.

11. The companion electronic device of claim 10,
wherein the dynamic type identifier for the activity comprises an identifier for a first application performed on the source electronic device and a descriptor for a dynamic type; and
wherein each dynamic type identifier from the set of dynamic type identifiers comprises an identifier for a corresponding application that is available on the companion electronic device and a descriptor for a corresponding dynamic type in a set of dynamic types for the corresponding application.

12. The companion electronic device of claim 11,
wherein each activity identifier in the set of activity identifiers is added to the set of activity identifiers when an application corresponding to the activity identifier is installed on the companion electronic device.

13. The companion electronic device of claim 12, wherein the advertisement message comprises a hash of a character string, the character string comprising the dynamic type information and an identifier that identifies a first application that performs the activity on the source electronic device.

14. The companion electronic device of claim 10, wherein the processing subsystem and the networking subsystem are further configured to perform operations for:
receiving a table of activities recently performed at the source electronic device; and
using an index that identifies an entry in the table of activities to determine the dynamic type identifier for the activity, wherein the dynamic type information comprises the index.

15. The companion electronic device of claim 10, wherein the processing subsystem and the networking subsystem are further configured to perform operations for:
receiving a second activity advertisement message from a second source electronic device, the second activity advertisement message comprising dynamic type information describing an attribute of an activity performed on the second source electronic device; and
based on comparing a first timestamp included with the activity advertisement message and a second timestamp included with the second activity advertisement message, determining that the activity performed in a first application on the source electronic device is a most recent activity of the activity performed on the source electronic device and the activity performed on the second source electronic device.

16. The companion electronic device of claim 10, wherein the activity advertisement and the extended activity data are communicated using a Bluetooth low-energy network protocol.

17. A non-transitory computer-readable medium including one or more sequences of instructions that, when executed by one or more processors of a companion electronic device, causes:
receiving an activity advertisement message from a source electronic device, the activity advertisement message comprising dynamic type information describing an attribute of an activity;
evaluating the dynamic type information to determine whether the companion electronic device includes an application configured to perform a corresponding activity by:
comparing a dynamic type identifier for the activity with a set of dynamic type identifiers for activities that are available at the companion electronic device; and
in response to determining that the dynamic type identifier is not in the set of dynamic type identifiers, comparing the dynamic type identifier to a set of activity identifiers for activities that are available at the companion electronic device;

in response to determining that the companion electronic device includes the application configured to perform the corresponding activity, requesting extended activity data for the activity from the source electronic device;

using the extended activity data received from the source electronic device to configure the application configured to perform the corresponding activity on the companion electronic device to perform the corresponding activity; and performing the corresponding activity using the application configured to perform the corresponding activity on the companion electronic device.

18. The non-transitory computer-readable medium of claim 17, wherein the dynamic type identifier for the activity comprises an identifier for a first application performed on the source electronic device and a descriptor for a dynamic type; and wherein each dynamic type identifier from the set of dynamic type identifiers comprises an identifier for a corresponding application that is available on the companion electronic device and a descriptor for a corresponding dynamic type in a set of dynamic types for the corresponding application.

19. The non-transitory computer-readable medium of claim 18, wherein each activity identifier in the set of activity identifiers is added to the set of activity identifiers when an application corresponding to the activity identifier is installed on the companion electronic device.

20. The non-transitory computer-readable medium of claim 19, wherein the advertisement message comprises a hash of a character string, the character string comprising the dynamic type information and an identifier that identifies a first application that performs the activity on the source electronic device.

21. The non-transitory computer-readable medium of claim 17, wherein the one or more sequences of instructions that, when executed by the one or more processors of the companion electronic device, further causes:

receiving a table of activities recently performed at the source electronic device; and using an index that identifies an entry in the table of activities to determine the dynamic type identifier for the activity, wherein the dynamic type information comprises the index.

22. The non-transitory computer-readable medium of claim 17, wherein the one or more sequences of instructions that, when executed by the one or more processors of the companion electronic device, further causes:

receiving a second activity advertisement message from a second source electronic device, the second activity advertisement message comprising dynamic type information describing an attribute of an activity performed on the second source electronic device; and based on comparing a first timestamp included with the activity advertisement message and a second timestamp included with the second activity advertisement message, determining that the activity performed in a first application on the source electronic device is a most recent activity of the activity performed on the source electronic device and the activity performed on the second source electronic device.

* * * * *